(12) United States Patent
Bhushan et al.

(10) Patent No.: US 9,814,040 B2
(45) Date of Patent: Nov. 7, 2017

(54) UL/DL WAVEFORM AND NUMEROLOGY DESIGN FOR LOW LATENCY COMMUNICATION

(71) Applicant: QUALCOMM Incorporated, San Diego, CA (US)

(72) Inventors: Naga Bhushan, San Diego, CA (US); Jing Jiang, San Diego, CA (US); Tingfang Ji, San Diego, CA (US); Krishna Kiran Mukkavilli, San Diego, CA (US); Joseph Binamira Soriaga, San Diego, CA (US); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/750,719

(22) Filed: Jun. 25, 2015

(65) Prior Publication Data

US 2016/0150532 A1 May 26, 2016

Related U.S. Application Data

(60) Provisional application No. 62/082,930, filed on Nov. 21, 2014.

(51) Int. Cl.
*H04W 72/04* (2009.01)
*H04L 1/18* (2006.01)
*H04L 5/00* (2006.01)

(52) U.S. Cl.
CPC ....... *H04W 72/0446* (2013.01); *H04L 1/1812* (2013.01); *H04L 1/1854* (2013.01);
(Continued)

(58) Field of Classification Search
CPC .......... H04W 72/0446; H04W 72/042; H04W 72/0493
(Continued)

(56) References Cited

U.S. PATENT DOCUMENTS 5,612,972 A * 3/1997 Fukushi ................ H04B 1/707
375/149
7,035,214 B1 4/2006 Seddigh et al.
(Continued)

FOREIGN PATENT DOCUMENTS

| EP | 1507352 A1 | 2/2005 |
| WO | WO-2013162189 A1 | 10/2013 |
| WO | WO-2014060010 A1 | 4/2014 |

OTHER PUBLICATIONS

ISA/EPO, International Search Report and Written Opinion of the International Searching Authority, Int'l. App. No. PCT/US2015/056890, Feb. 1, 2016, European Patent Office, Rijswijk, NL, 15 pgs.

*Primary Examiner* — Ronald B Abelson
(74) *Attorney, Agent, or Firm* — Liem T. Do

(57) ABSTRACT

Methods, systems, and devices for wireless communication are described. In some examples, a wireless system may use a staggered uplink/downlink (UL/DL) format in which the symbol periods of the downlink are offset from the symbol periods of the uplink. Thus, if a user equipment (UE) receives a transmission in a first symbol period, it may decode the transmission and transmit a response in a staggered symbol period (e.g., in a UL control channel symbol period beginning one half of a symbol period after the first symbol period). A base station may then receive the response and, if it is a negative acknowledgement (NACK), retransmit during the third symbol period following the first symbol period. In another example, thin control channels may be
(Continued)

used to reduce the round trip time between receiving a transmission and a retransmission.

27 Claims, 19 Drawing Sheets

(52) U.S. Cl.
CPC .......... *H04L 5/0055* (2013.01); *H04W 72/042* (2013.01); *H04W 72/0493* (2013.01); *H04L 1/1887* (2013.01)

(58) Field of Classification Search
USPC ........................................................ 370/277
See application file for complete search history.

(56) References Cited

U.S. PATENT DOCUMENTS

| | | |
|---|---|---|
| 7,894,468 B2 | 2/2011 | Chuah et al. |
| 7,912,092 B2 | 3/2011 | Kowalski |
| 2004/0042492 A1 | 3/2004 | Suzuki et al. |
| 2011/0249766 A1 | 10/2011 | Liang et al. |
| 2012/0076113 A1* | 3/2012 | Proctor, Jr. ....... H04W 72/1257 370/335 |

\* cited by examiner

UL/DL WAVEFORM AND NUMEROLOGY DESIGN FOR LOW LATENCY COMMUNICATION

CROSS REFERENCES

The present application for patent claims priority to U.S. Provisional Patent Application No. 62/082,930 by Bhushan et al., entitled "UL/DL Waveform and Numerology Design for Low Latency Communication," filed Nov. 21, 2014, assigned to the assignee hereof, and expressly incorporated by reference herein.

BACKGROUND

Field of Disclosure

The following relates generally to wireless communication, and more specifically to uplink/downlink (UL/DL) waveform and numerology design for low latency communication.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

A wireless communication system may experience interference and noise such that a signal may be perturbed beyond recognition. Thus, a wireless system may use a hybrid automatic repeat request (HARQ) to ensure signal the reception. However, employment of HARQ may introduce additional decoding delay, which may increase latency. For example, a UE may receive a transmission, send a negative acknowledgement, and then receive a retransmission after a round trip delay. A round trip delay may also introduce latency when a UE makes a scheduling request (SR) for UL resources.

SUMMARY

The present disclosure may relate generally to wireless communications systems, and more particularly to improved systems, methods, or apparatuses for UL/DL waveform and numerology design for low latency communication. In one example, a wireless system may use a staggered uplink/downlink (UL/DL) format in which the symbol periods of the downlink are offset from the symbol periods of the uplink. Thus, if a user equipment (UE) receives a transmission in a first symbol period, the UE may decode the transmission and transmit a response in a staggered symbol period (e.g., in a UL control channel symbol period beginning one half of a symbol period after the first symbol period). A base station may then receive the response and, if the response is a negative acknowledgement (NACK), retransmit during the third symbol period following the first symbol period. In another example, thin control channels may be used to reduce the round trip time between receiving a transmission and a retransmission. In another example, the round trip time may occur between a scheduling request (SR) and a UL transmission.

A method for wireless communications at a UE is described. The method may include receiving a message during a first symbol period according to a first timing configuration, decoding the message during a decoding time period that is shorter than the first symbol period, and transmitting a response to the received message based at least in part on the decoding, the response transmitted during a second symbol period according to a second timing configuration, wherein the second timing configuration is staggered relative to the first timing configuration according to a predetermined offset.

An apparatus for wireless communications at a UE is described. The apparatus may include means for receiving a message during a first symbol period according to a first timing configuration, means for decoding the message during a decoding time period that is shorter than the first symbol period, and means for transmitting a response to the received message based at least in part on the decoding, the response transmitted during a second symbol period according to a second timing configuration, wherein the second timing configuration is staggered relative to the first timing configuration according to a predetermined offset.

A further apparatus for wireless communications at a UE is described. The apparatus may include a processor and memory coupled to the processor, wherein the processor may be configured to receive a message during a first symbol period according to a first timing configuration, decode the message during a decoding time period that is shorter than the first symbol period, and transmit a response to the received message based at least in part on the decoding, the response transmitted during a second symbol period according to a second timing configuration, wherein the second timing configuration is staggered relative to the first timing configuration according to a predetermined offset.

A non-transitory computer-readable medium storing code for wireless communications at a UE is described. The code may include instructions executable to receive a message during a first symbol period according to a first timing configuration, decode the message during a decoding time period that is shorter than the first symbol period, and transmit a response to the received message based at least in part on the decoding, the response transmitted during a second symbol period according to a second timing configuration, wherein the second timing configuration is staggered relative to the first timing configuration according to a predetermined offset.

In some examples of the method, apparatuses, or non-transitory computer-readable medium described above, the message comprises a data message and the response comprises a HARQ feedback message. Additionally or alternatively, in some examples the HARQ feedback message comprises a NACK message, and receiving a retransmission of the message during a third symbol period, wherein fewer than three symbol periods are between the first symbol period and the third symbol period according to the first timing configuration.

In some examples of the method, apparatuses, or non-transitory computer-readable medium described above, the message is an SR and the response is a UL grant, and receiving a UL message using the UL grant. Additionally or alternatively, in some examples the second symbol period begins prior to a third symbol period of the first timing configuration, wherein the third symbol period immediately follows the first symbol period. In some examples, the first and third symbol periods are DL symbol periods and the second symbol period is a UL symbol period.

In some examples of the method, apparatuses, or non-transitory computer-readable medium described above, the second symbol period begins after one half of a length of the first symbol period following the first symbol period according to the first timing configuration, and a length of the second symbol period is equal to the length of the first symbol period.

A method for wireless communications at a UE is described. The method may include receiving a message during a first symbol period, decoding the message during a decoding time period that is shorter than the first symbol period, and sending a response to the message based on the decoding during a second symbol period according to a control channel timing configuration, wherein the control channel timing configuration is based on a shorter symbol duration than a data channel timing configuration.

An apparatus for wireless communications at a UE is described. The apparatus may include means for receiving a message during a first symbol period, means for decoding the message during a decoding time period that is shorter than the first symbol period, and means for sending a response to the message based on the decoding during a second symbol period according to a control channel timing configuration, wherein the control channel timing configuration is based on a shorter symbol duration than a data channel timing configuration.

A further apparatus for wireless communications at a UE is described. The apparatus may include a processor and memory coupled to the processor, wherein the processor may be configured to receive a message during a first symbol period, decode the message during a decoding time period that is shorter than the first symbol period, and send a response to the message based on the decoding during a second symbol period according to a control channel timing configuration, wherein the control channel timing configuration is based on a shorter symbol duration than a data channel timing configuration.

A non-transitory computer-readable medium storing code for wireless communication at a UE is described. The code may include instructions executable to receive a message during a first symbol period, decode the message during a decoding time period that is shorter than the first symbol period, and send a response to the message based on the decoding during a second symbol period according to a control channel timing configuration, wherein the control channel timing configuration is based on a shorter symbol duration than a data channel timing configuration.

In some examples of the method, apparatuses, or non-transitory computer-readable medium described above, the control channel timing configuration comprises an uplink (UL) control channel timing configuration and a downlink (DL) control channel timing configuration, and the DL control channel configuration is staggered in time relative to the UL control channel timing configuration according to an offset. Additionally, in some examples the offset is predetermined.

In some examples of the method, apparatuses, or non-transitory computer-readable medium described above, the message comprises a data transmission based on the data channel timing configuration and the response comprises a HARQ feedback message. Additionally or alternatively, in some examples the HARQ feedback message comprises a NACK message, and receiving a retransmission during a third symbol period, wherein fewer than three symbol periods are between the first symbol period and the third symbol period according to the data channel timing configuration.

In some examples of the method, apparatuses, or non-transitory computer-readable medium described above, the message is an SR and the response is a UL grant, and receiving a UL message using the UL grant.

In some examples of the method, apparatuses, or non-transitory computer-readable medium described above, the second symbol period begins prior to a third symbol period of the first timing configuration, and the third symbol period immediately follows the first symbol period. Additionally or alternatively, in some examples the second symbol period begins after one half of a length of the first symbol period following the first symbol period according to the first timing configuration, and a length of the second symbol period is equal to the length of the first symbol period.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, or apparatuses for low latency communication. In some wireless communication systems, the uplink and downlink may have the same symbol duration and the boundaries of the transmit time intervals (TTIs) may be synchronized. Additionally, UL/DL data, control, and feedback/acknowledgement (ACK) channels may be of the same TTI/symbol duration. However, such rigidity in TTI structure and symbol duration may increase hybrid automatic repeat request (HARQ) or scheduling request (SR) latency. Thus, a wireless communication system may employ staggered UL/DL symbols to reduce HARQ latency due to decoding delay. Additionally, a short symbol period may be used to reduce overall HARQ latency.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
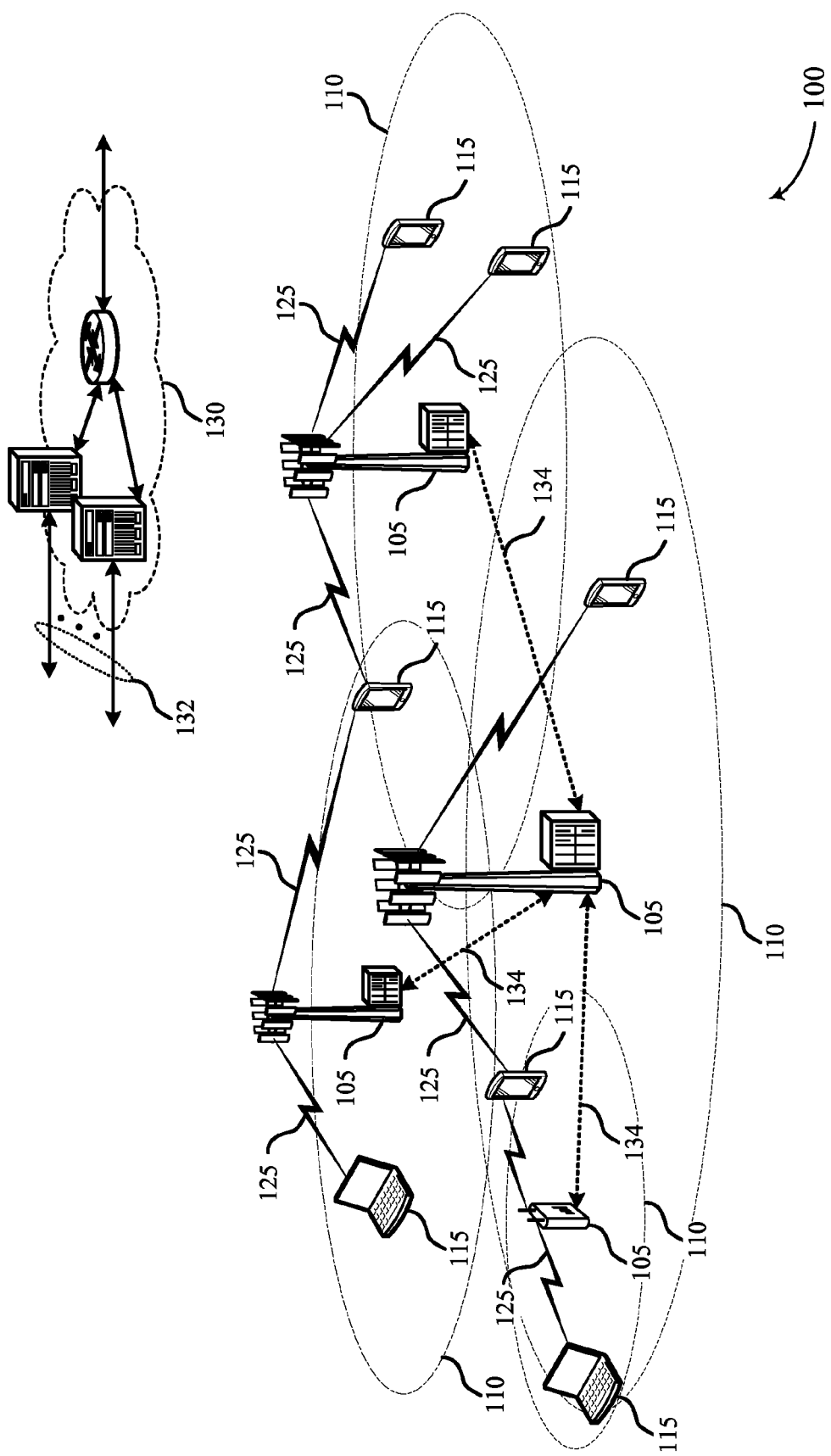
FIG. 1 illustrates an example of a wireless communications system for low latency communication in accordance with various aspects of the present disclosure.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The wireless communication links 125 shown in wireless communications system 100 may include UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Communication links 125 may include one or more channels dedicated for specific types of information. For example, a physical downlink control channel (PDCCH) carries downlink control information (DCI) in control channel elements (CCEs), which may consist of nine logically contiguous resource element groups (REGs), where each REG contains 4 resource elements (REs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

In some cases, PDCCH transmissions can carry DCI messages associated with multiple users, and each UE 115 may decode the DCI messages that are intended for it. For example, each UE 115 may be assigned a cell radio network temporary identity (C-RNTI) and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space always starts from CCE 0. The starting index for a UE specific search space depends on the C-RNTI, the subframe index, the CCE aggregation level and a random seeds. A UE 115 may attempt to decode DCI by performing a process known as a blind decode, during which search spaces are randomly decoded until the DCI is detected. During a blind decode, the user equipment may attempt descramble all potential DCI messages using its C-RNTI, and perform a CRC check to determine whether the attempt was successful.

The physical uplink control channel (PUCCH) may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs may or may not have a dedicated SR channel). PUCCH resources for SR and CQI may be lost when the UE is no longer synchronized.

Time intervals in LTE may be expressed in multiples of a basic time unit (e.g., the sampling period, $Ts=1/30,720,000$ seconds). Time resources may be organized according to radio frames of length of 10 ms ($Tf=307200 \cdot Ts$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs). Synchronization of the timing for a base station 105 and a UE 115 may be achieved using primary and secondary synchronization symbols (PSS and SSS) and timing advance commands transmitted by the base station 105.

For example, a UE 115 attempting to access a wireless network may perform an initial cell search by detecting a PSS from a base station 105. The PSS may enable synchronization of slot timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. Both the PSS and the SSS may be located in the central 62 and 72 subcarriers of a carrier, respectively. After receiving the PSS and SSS, the UE 115 may receive a master information block (MIB), which may be transmitted in the PBCH. The MIB may contain system bandwidth information, an SFN, and a PHICH configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

According to the present disclosure, a wireless system may use a staggered UL/DL format in which the symbol periods of the downlink are offset from the symbol periods of the uplink. Thus, if a UE 115 receives a transmission in a first symbol period, the UE 115 may decode the transmission and transmit a response in a staggered symbol period (e.g., in a UL control channel symbol period beginning one half of a symbol period after the first symbol period). A base station 105 may then receive the response and, if the response is a NACK, retransmit during the third symbol period following the first symbol period. In another example, thin control channels may be used to reduce the round trip time (RTT) between receiving a transmission and a retransmission. In another example, the RTT may occur between a scheduling request (SR) and a UL transmission.

Figure 2:
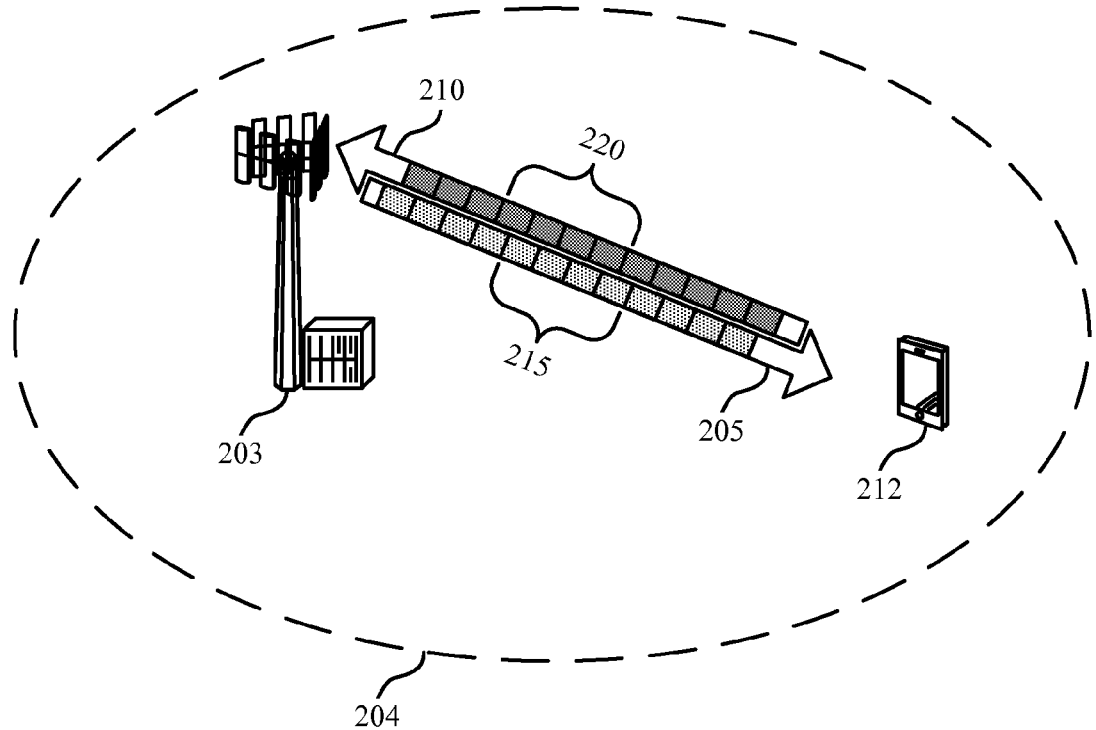
FIG. 2 illustrates an example of a wireless communications subsystem for low latency communication in accordance with various aspects of the present disclosure.

FIG. 2 illustrates an example of a wireless communications subsystem 200 for low latency communication in accordance with various aspects of the present disclosure. Wireless communications subsystem 200 may include UE 212, which may be an example of a UE 115 described above with reference to FIG. 1. Wireless communications subsystem 200 may also include a base station 203, which may be an example of a base station 105 described above with reference to FIG. 1. Base station 203 may communicate with any UE 212 within its geographic coverage area 204 (e.g., via downlink 205 and uplink 210), as generally described with respect to FIG. 1.

Downlink 205 and uplink 210 may convey information (e.g., control and data) using physical resources structured according to subcarriers in the frequency domain and symbol periods in the time domain. An RTT for communication between UE 212 and base station 203 may depend on the configuration of the resources. For example, in some cases, the round trip time may be reduced if the symbol periods of downlink 205 and uplink 210 are shifted in time relative to each other (e.g., downlink 205 and uplink 210 are staggered). In another example, the round trip time may be reduced if the symbol periods of DL or UL control channels may be smaller than those for data channels.

For example, wireless communications subsystem 200 may employ a HARQ scheme to improve the quality of communications between base station 203 and UE 212. If the symbol boundaries for downlink 205 and uplink 210 are aligned, a HARQ process may take 4 symbol periods. That is, base station 203 may transmit control or data traffic in a first symbol, and UE 212 may decode the information in a second symbol. In an immediately subsequent symbol (e.g., the third symbol), UE 212 may transmit an ACK or NACK to base station 203 conveying the reception status of the information. In the fourth symbol, base station 203 may decode the ACK/NACK and use the information to determine the content of its next transmission (e.g., a redundancy version of the data). Because each transmission is decoded upon reception, there may be a best-case limit regarding communication latency (e.g., the best-case scenario between downlink 205 transmissions may be 4 symbols). Thus, wireless communications subsystem 200 may stagger downlink 205 and uplink 210, which may improve latency.

According to one example of the present disclosure, the symbols in downlink 205 (e.g., symbols 215) may be offset from the symbols of uplink 210 (e.g., symbols 220), as depicted in wireless communications subsystem 200. Such a scheme may improve the latency of a transmission which uses HARQ. For instance, base station 203 and UE 212 may use only a portion of a symbol period to decode transmissions. In other words, because the process of decoding occurs during the tail end of a staggered symbol period, the response may be sent sooner following successful decoding and the RTT (e.g., the delay between downlink 205 transmissions) may be reduced (e.g., there may only be two symbols between the original transmission and the retransmission). Although described with reference to a HARQ scheme for downlink 205, the staggered version of downlink 205 and uplink 210 may be used for other control channel transmissions such as those involved in a scheduling request.

According to another example of the present disclosure, the length of the symbols used to convey control information on downlink 205 and uplink 210 may be reduced (e.g., the control channel symbols may be "thin"), thereby decreasing transmit times and possibly resulting in improved RTT. For example, a NACK may be sent sooner following decoding of a data transmission because the UL TTIs for sending the NACK may be shorter than the data channel TTIs. Similarly, the RTT for an SR may be reduced using thin control channel TTIs.

Figure 3A:
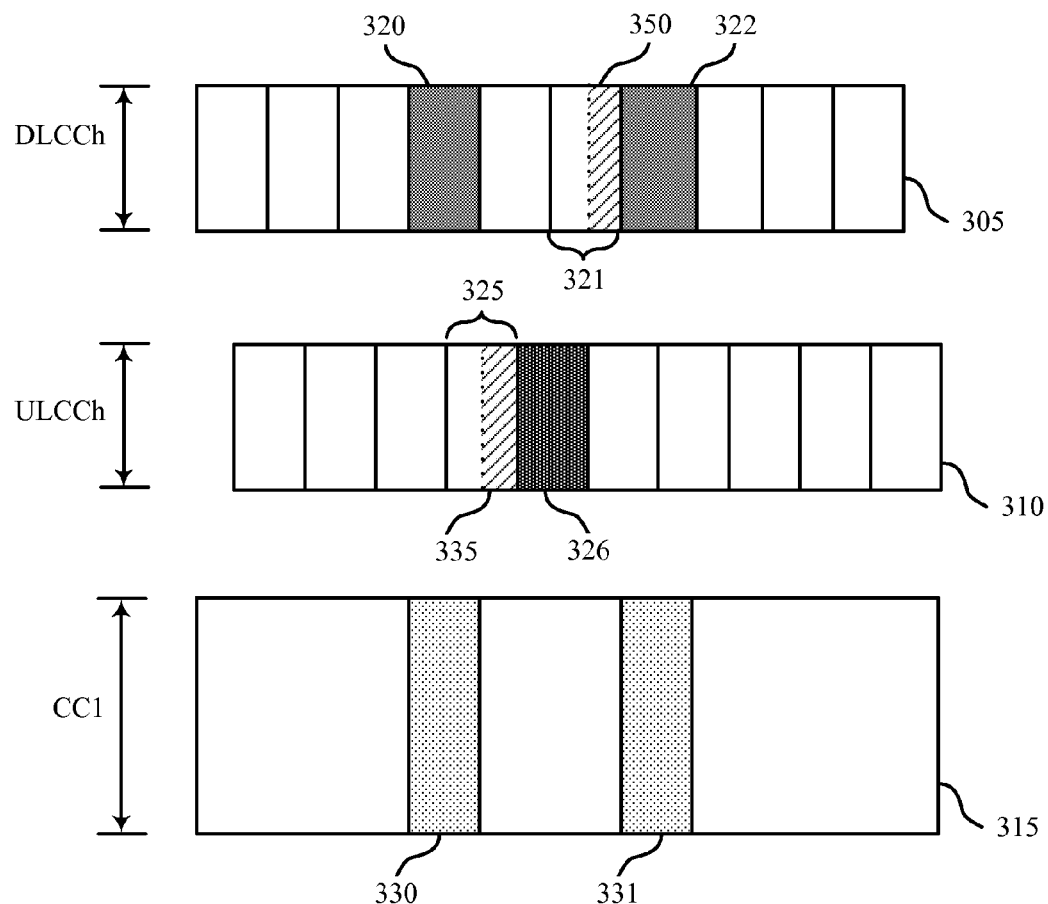
FIG. 3A illustrates an example of a downlink HARQ timeline for low latency communication in accordance with various aspects of the present disclosure.

FIG. 3A illustrates an example of a downlink HARQ timeline 300 for low latency communication in accordance with various aspects of the present disclosure. Downlink HARQ timeline 301 may be an example of a HARQ procedure used by a UE or base station as described with reference to the preceding figures, including UE 212 and a base station 203, as described above with reference to FIG. 2. Downlink HARQ timeline 301 may include downlink control channel (DLCCh) 305, and uplink control channel ULCCh 310, which may be aspects of the downlink 205 and uplink 210 described with reference to FIG. 2, as well as component carrier CC1 315, which may be used for transmission of user data. Although shown using symbol periods of nominal length, HARQ timeline 301 may be used with short DL control channel symbol periods and short UL control channel symbol periods. Additionally, although shown as offset by half of a symbol period, the symbols 320 of downlink control channel DLCCh 305 and the symbols 325 of uplink control channel ULCCh 310 may be staggered by any predetermined offset.

Downlink HARQ timeline 301 may include the base station transmitting a downlink to the UE at symbol 320. The downlink grant may indicate resources allocated to the UE 212 for a DL transmission (e.g., on component carrier CC1 315). Using the downlink grant, the UE 212 may receive a DL data message at symbol 330, which may be conveyed on component carrier CC1 315. Once the entirety of the DL data message has been received, the UE 212 may finish decoding the message during a portion of symbol 330 (e.g., during downlink decoding time period 335). In some cases, DL decoding time period 335 may be shorter than the symbols 320 for downlink control channel DLCCh 305 (e.g., DL decoding time period 335 may be shorter than symbols 320). DL decoding time period 335 may also be shorter than the symbols 325 for uplink control channel ULCCh 310. Once the UE 212 has finished decoding DL data message, the UE 212 may send an ACK/NACK to the base station 203 at symbol 326, and the base station 203 may decode the ACK/NACK during a portion of symbol 321 (e.g., during uplink decoding time period 350). If the response is a NACK, the base station 203 may transmit a downlink grant on symbol 322, as well as a DL data message on symbol 331 (i.e., a retransmission).

In other words, a DL HARQ timeline may include a base station sending control/traffic to a UE 212 in a first symbol. The UE 212 may then decode the control/traffic and send an ACK/NACK in the immediately subsequent symbols (e.g., during the second and third symbols, respectively). During the fourth symbol, the base station may receive and decode the ACK/NACK. Thus, the total RTT for HARQ may be 4 symbols (including the symbol periods for transmission and retransmission). In some examples, the minimum physical delay (i.e., the component of the RTT based on transmission time) may be 2 symbols, and a symbol may be 27.5 µs, the worst case total delay may be 6 symbols, or 165 µs. In some cases, one symbol per RTT may be saved by staggering the UL/DL. That is, the HARQ RTT may be reduced from 4 symbols to 3 symbols. In an alternative example, a short ACK/control symbol period may be used, thereby saving 2 symbols per RTT (e.g., HARQ RTT may decrease from 4 symbols to 2 symbols, giving a worst case delay of 55 µs).

Figure 3B:
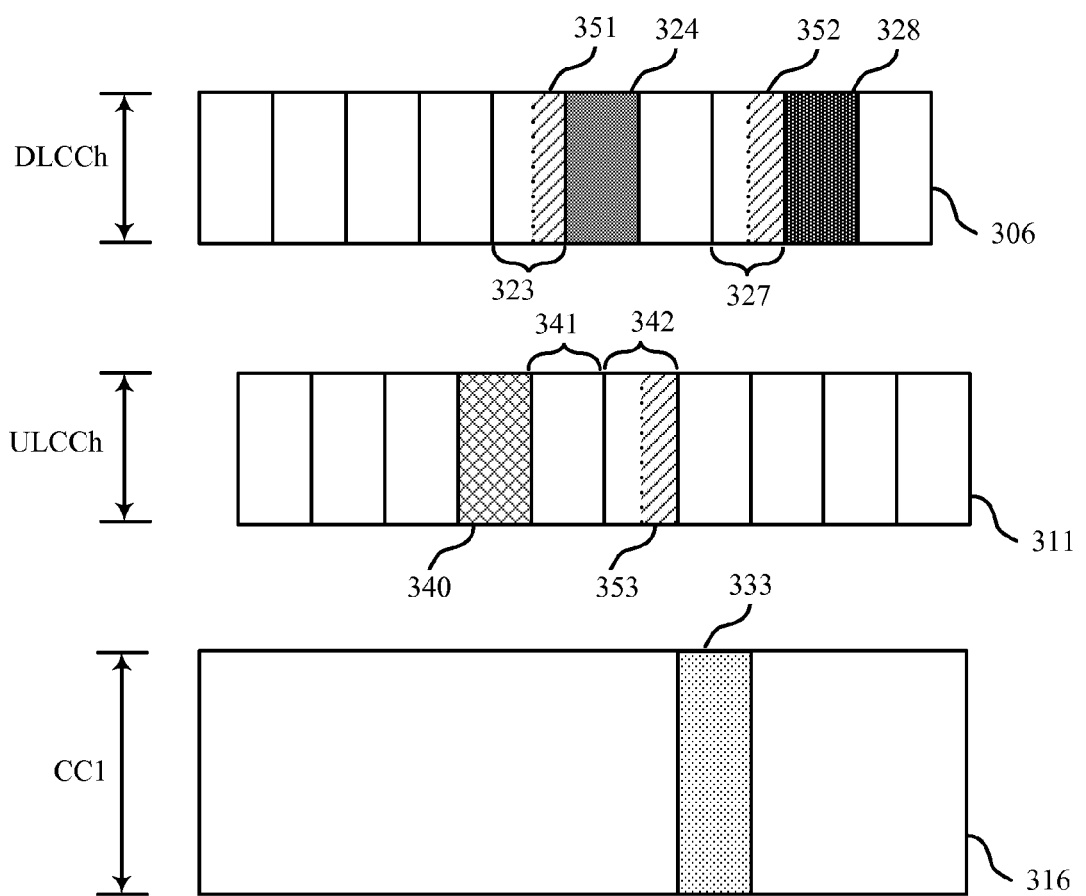
FIG. 3B illustrates an example of a scheduling request timeline for low latency communication in accordance with various aspects of the present disclosure.

FIG. 3B illustrates an example of a scheduling request timeline 302 for low latency communication in accordance with various aspects of the present disclosure. Scheduling request timeline 302 may be an example of a scheduling request procedure used by a UE and base station described with reference to the preceding figures, including UE 212 and a base station 105 203, as described above with reference to FIG. 2. Scheduling request timeline 302 may include downlink control channel (DLCCh) 306, and uplink control channel (ULCCh) 311, which may be aspects of the downlink 205 and uplink 210 described with reference to FIG. 2, as well as component carrier CC1 316. Although shown using symbol periods of nominal length, the scheduling request timeline 302 may be used with short downlink control channel DLCCh 306 symbol periods and short uplink control channel ULCCh 311 symbol periods. Additionally, although shown as offset by half of a symbol period, the symbols of downlink control channel DLCCh 306 and the symbols of uplink control channel ULCCh 311 may be staggered by any offset, including one which has been predetermined.

Scheduling request timeline 302 may include the UE 212 sending a scheduling request to the base station 203 over symbol 340 on ULCCh 311 to request resources for an uplink transmission. The base station 203 may receive the scheduling request symbol during portions of adjacent symbols (e.g., symbols 323 and 324) and decode the scheduling request during an uplink decoding time period 351. The uplink decoding time period 353 may be part of symbols 323. Once the scheduling request has been decoded, the base station 105 may transmit a UL grant over 324. The UE 212 may receive the UL grant during portions adjacent symbols 341 and 342 of ULCCh 311. During a portion of symbol 342 (e.g., downlink decoding time period 353), the UE 212 may decode the UL grant. Thus, in a symbol immediately subsequent to symbol 342 (i.e., during symbol 333), the UE 212 may use resources indicated by the UL grant to transmit UL data. The UL data may be received by the base station 203 and subsequently decoded during symbol 327 (e.g., during uplink decoding time period 352). Based on the result of decoding UL data symbol 327, the base station 203 may transmit an ACK/NACK during symbol 328.

In other words, in an SR timeline example, a UE 212 may send an SR to a base station during a first symbol period. In the two subsequent symbols (e.g., a second symbol period and a third symbol period), the base station 203 may process the SR and transmit a UL grant to the UE 212, respectively. Thus, in a fourth symbol period the UE 212 may decode the UL grant, and in a fifth symbol period the UE 212 may send UL traffic to the base station. The UL traffic may be received and processed at the base station in a sixth symbol period, and an ACK/NACK may be sent by the base station in a seventh symbol period. Finally, in an eighth symbol period, the UE may receive the ACK/NACK from the base station 203 and decode it. Thus, the full UL HARQ TTI may be 8 symbols, or 220 µs, and the minimum delay may be 6 symbols, or 167 µs. Accordingly, the worst case delay may be 10 symbols, or 278 µs. However, by using UL/DL staggering, the RTT of a UL HARQ may be decreased by two symbols, thereby reducing the delay from 8 symbols to 6.

Figure 3C:
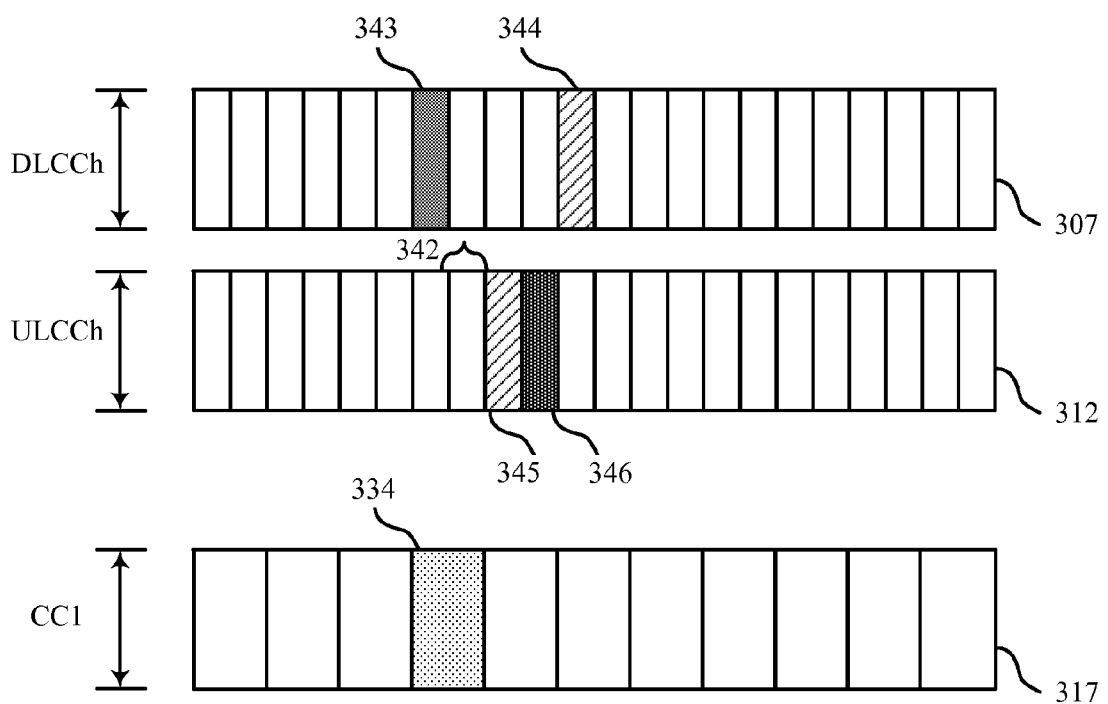
FIG. 3C illustrates an example of a thin-symbol downlink HARQ timeline for low latency communication in accordance with various aspects of the present disclosure.

FIG. 3C illustrates an example of a thin-symbol downlink HARQ timeline 303 for low latency communication in accordance with various aspects of the present disclosure. Thin-symbol downlink HARQ timeline 303 may be an example of a HARQ procedure used by a UE and a base station, as described above with reference to FIGS. 1, 2, 3A and 3B. Thin-symbol downlink HARQ timeline 303 may include DL control channel (DLCCh) 307, and UL control channel (ULCCh) 312, which may be aspects of the downlink 205 and uplink 210 described with reference to FIG. 2, as well as component carrier CC1 317. Although shown using aligned symbol periods, thin-symbol downlink HARQ timeline 303 may include staggered downlink control channel symbol periods and uplink control channel symbol periods, as described above with reference to FIGS. 2 and 3A. Additionally, the length of symbol periods for downlink control channel DLCCh 307 and uplink control channel ULCCh 312 may be any fraction of the symbol period length of component carrier CC1 317 (e.g., half as long).

Thin-symbol downlink HARQ timeline 303 may include the base station 203 transmitting a downlink grant to the UE at thin symbol 343. Accordingly, the base station 203 may transmit DL data to the UE 212 during symbol 334 of CC1 317. The UE 212 may receive the DL data and then decode it during thin symbol 342. Upon decoding the DL data, the UE 212 may transmit an ACK/NACK to the base station 105 during thin symbol 346, and the base station 203 may decode the ACK/NACK during thin symbol 344. Thus, a short ACK/control symbol period may be used, thereby saving 2 symbols per RTT (e.g., HARQ RTT may decrease from 4 symbols to 2 symbols, giving a worst case delay of 55 µs).

Figure 3D:
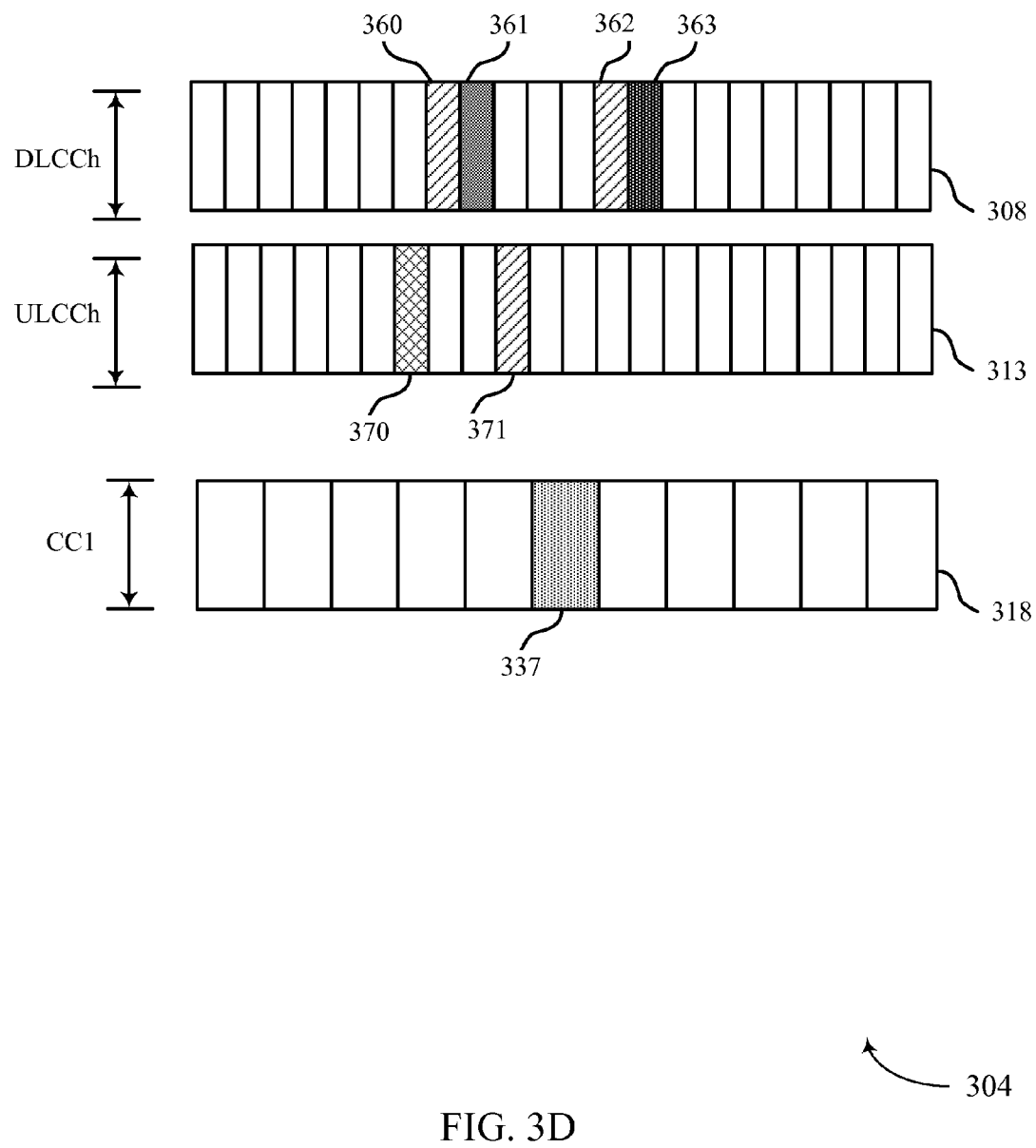
FIG. 3D illustrates an example of a thin-symbol scheduling request timeline for low latency communication in accordance with various aspects of the present disclosure.

FIG. 3D illustrates an example of a thin-symbol scheduling request timeline 304 for low latency communication in accordance with various aspects of the present disclosure. Thin-symbol scheduling request timeline 304 may be an example of a scheduling request procedure used by a UE and a base station, as described above with reference to FIGS. 1, 2, and 3B, including UE 212 and base station 203. Thin-symbol scheduling request timeline 304 may include downlink control channel DLCCh 308, and uplink control channel ULCCh 313, which may be aspects of the downlink 205 and uplink 210 described with reference to FIGS. 2 and 3B, as well as component carrier CC1 318. Although shown using aligned symbol periods, thin-symbol scheduling request timeline 304 may stagger the symbol periods of downlink control channel DLCCh 308 and uplink control channel ULCCh 313, as described above with reference to FIGS. 2 and 3B. Additionally, the length of symbol periods for downlink control channel DLCCh 308 and uplink control channel ULCCh 313 may be any fraction of the symbol period length of component carrier CC1 318 (e.g., half as long).

Thin-symbol scheduling request timeline 304 may include the UE 115 transmitting a scheduling request to the base station 203 during symbol 370. The scheduling request may be decoded by the base station 203 during symbol 360. Subsequently, the base station 203 may transmit a UL grant to the UE 212 during symbol 361, indicating uplink resources the UE 212 may use for a data transmission. The UE 212 may decode the UL grant during symbol 371, after which the UE 212 may transmit UL data during symbol 337 of CC1 318 on resources assigned by the UL grant. The base station 105 may receive the UL data and subsequently decode the UL data during symbol 362. Based on the results of the decoding, the base station 203 may send an ACK/NACK to the UE 212 during symbol 363. Thus, two symbols may be saved for each UL RTT by using a short symbol period for ACK/control channels. Thus, the worst case delay may be 4 symbols or 110 µs.

Figure 4A:
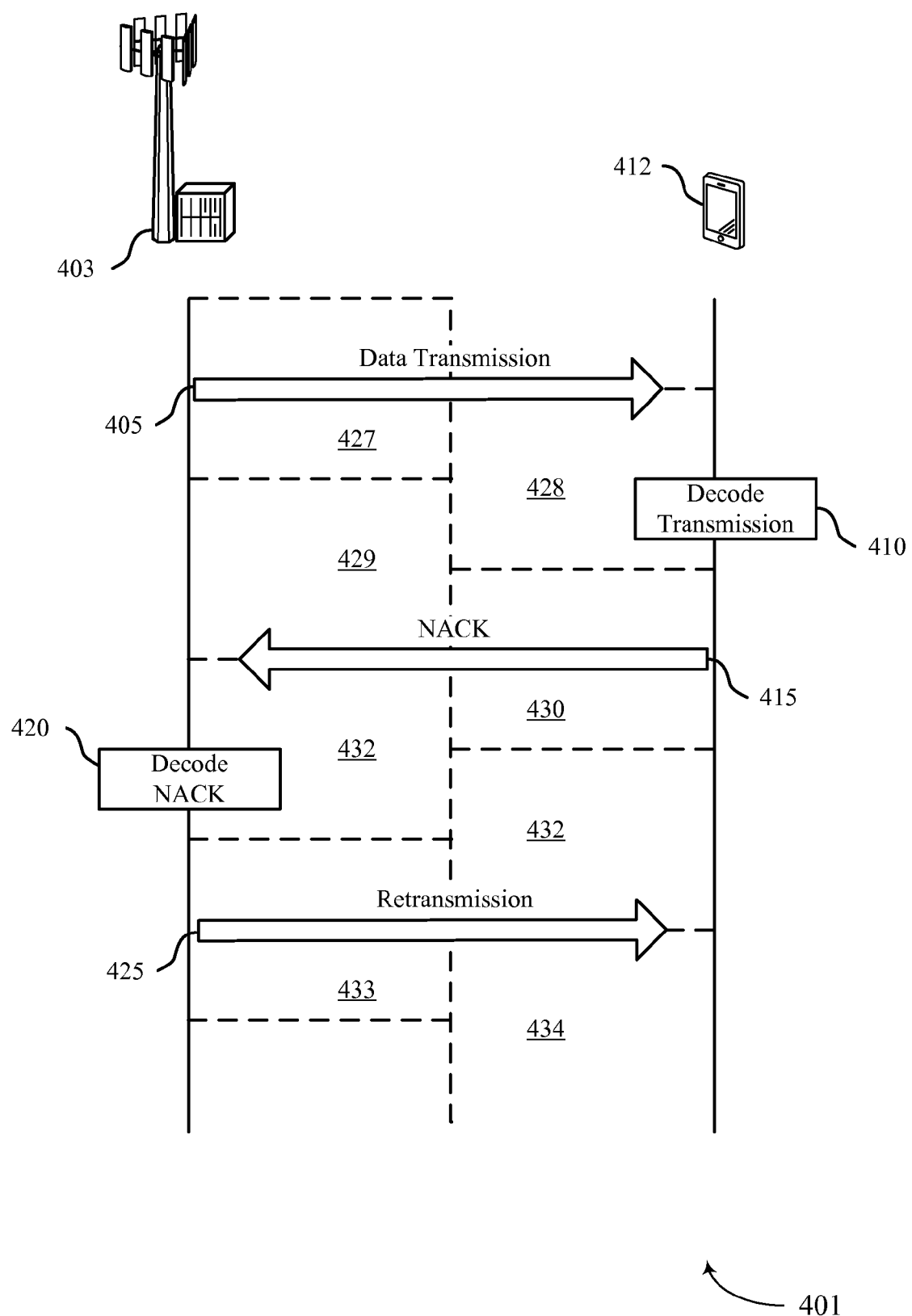
FIG. 4A illustrates an example of a process flow for low latency communication in accordance with various aspects of the present disclosure.

FIG. 4A illustrates an example of a process flow 401 for low latency communication in accordance with various aspects of the present disclosure. Process flow 401 may include a UE 412, which may be an example of a UE 115 or 212 described above with reference to FIGS. 1-2. Process flow 401 may also include a base station 403, which may be an example of a base station 105 or 203 described above with reference to FIGS. 1-2. Additionally, process flow 401 may use aspects of a UL/DL format such as described by FIGS. 3A and 3C. Process flow 401 may be based on a staggered DL symbol periods 427, 429, 432, 433 and UL symbol periods 428, 430, 432, 434.

At 405, UE 412 may receive a message during a first symbol period (DL symbol period 427) according to a first timing configuration. In some examples the message may be a data transmission which may be accompanied by a DL grant.

At 410, UE 412 may decode the message during a decoding time period that may be shorter than the first symbol period. The decoding time period may take place during the latter half of UL symbol period 428.

At 415, UE 412 may transmit a response to the received message based on the decoding. The response may be transmitted during a second UL symbol period 430 according to a second timing configuration, wherein the second (UL) timing configuration may be staggered relative to the first (DL) timing configuration, which may include DL symbol period 429, according to a predetermined offset. In some cases, the response may include a HARQ feedback message (e.g., a NACK).

At 420, base station 403 may decode the response from UE 412 during DL symbol period 431. In some examples, base station 403 may send a message to UE 412, for example following UL symbol period 432, based on the decoding of the response from UE 412. For example, base station 403 may send a retransmission of the message (e.g., a redundancy version for incremental HARQ).

At 425, UE 412 may receive a retransmission of the message during a third symbol period, which may be DL symbol period 433, and which may occur before UL symbol period 434, wherein fewer than three symbol periods are between the first symbol period and the third symbol period according to the first timing configuration.

As discussed above with reference to FIG. 3B, a thin TTI configuration (not shown) may be used in place of, or in conjunction with, the staggered control channel configuration illustrated by process flow 401.

Figure 4B:
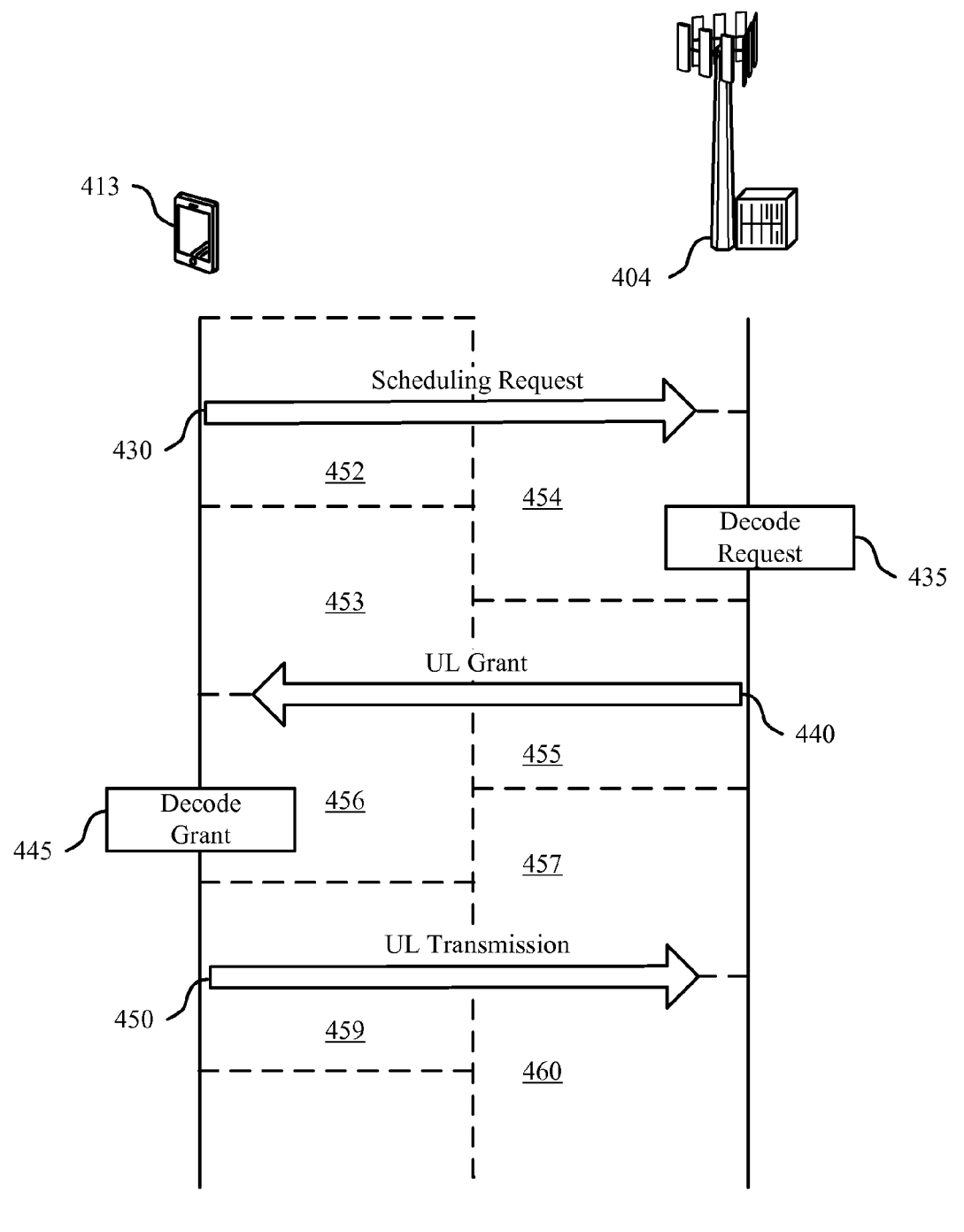
FIG. 4B illustrates an example of a process flow for low latency communication in accordance with various aspects of the present disclosure.

FIG. 4B illustrates an example of a process flow 402 for low latency communication in accordance with various aspects of the present disclosure. Process flow 402 may include a UE 413, which may be an example of a UE 115 or 212 described above with reference to FIGS. 1-2. Process flow 402 may also include a base station 404, which may be an example of a base station 105 or 203 described above with reference to FIGS. 1-2. Additionally, process flow 402 may use aspects of a UL/DL format such as described by FIGS. 3B and 3D. Process flow 402 may be based on a staggered DL symbol periods 452, 453, 456, 459 and UL symbol periods 454, 455, 457, 460. In some cases, the length of DL symbol periods 452, 453, 456, 459 and UL symbol periods 454, 455, 457, 460 may be equal.

At 430, UE 413 and send (and base station 404 may receive) an SR message from UE 413 during a first UL symbol period 452. In some examples, the message may be a request for resources for a subsequent UL transmission.

At 435, base station 404 may decode the message during a decoding time period that is shorter than the first UL symbol period 452. In some cases, base station 404 may decode the request during the latter portion of DL symbol period 454.

At 440, base station 404 may transmit a response (e.g., a UL grant in response to the SR) to UE 413. The response may be transmitted during a second DL symbol period 455. In some examples the second DL symbol period 455 begins prior to a third UL symbol period 456 of the first timing configuration. In some examples the second symbol DL period 455 begins after one half of a length following the end of the first UL symbol period 452 according to the first timing configuration.

At 445, UE 413 may decode the UL grant. For example, UE 413 may decode the UL grant during the latter portion of UL symbol period 456 (which corresponds to the initial portion of DL symbol period 457).

At 450, UE 413 may transmit a UL message using the resources indicated by the UL grant. For example, UE 413 may transmit the UL message during UL symbol period 459, which may occur three symbol periods after the initial SR (i.e., with only two intervening symbol periods 453 and 456).

In some examples, base station 404 may decode the UL transmission and send a HARQ response (e.g., and ACK/NACK message) using the DL control channel. The RTT of this UL HARQ may also be reduced based on the staggered control channels.

Figure 5:
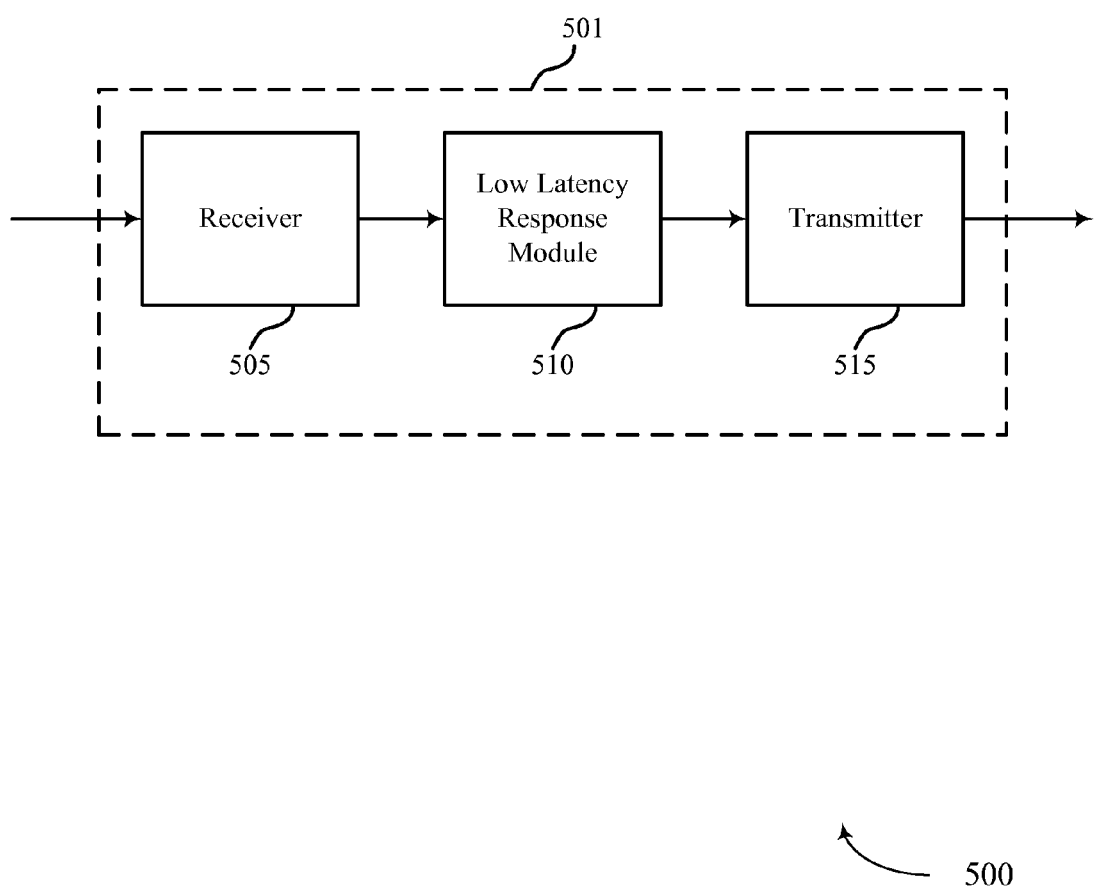
FIG. 5 shows a block diagram of a device configured for low latency communication in accordance with various aspects of the present disclosure.

FIG. 5 shows a block diagram 500 of a device 501 configured for low latency communication in accordance with various aspects of the present disclosure. Device 501 may be an example of aspects of a UE 115, 212, 412, 413 or of a base station 105, 203, 403, 404 described with reference to FIGS. 1-4. Device 501 may include a receiver 505, a low latency response module 510, or a transmitter 515. Device 501 may also include a processor. Each of these components may be in communication with each other.

The components of device 501 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to low latency communication, etc.). Information may be passed on to the low latency response module 510, and to other components of device 501. In some examples, the receiver 505 may receive a message during a first symbol period according to a first timing configuration. In some examples, the receiver 505 may receive a retransmission of the message during a third symbol period, wherein fewer than three symbol periods are between the first symbol period and the third symbol period according to the first timing configuration. In some examples, the receiver 505 may receive a message during a first symbol period. In some examples, the receiver 505 may receive a retransmission during a third symbol period, wherein fewer than three symbol periods are between the first symbol period and the third symbol period according to the data channel timing configuration. In the case where device 501 represents a base station 105, the receiver 505 may receive a UL message using the UL grant.

The low latency response module 510 may receive a message during a first symbol period according to a first timing configuration, decode the message during a decoding time period that is shorter than the first symbol period, and transmit a response to the received message based at least in part on the decoding, the response transmitted during a second symbol period according to a second timing configuration, wherein the second timing configuration is staggered relative to the first timing configuration according to a predetermined offset.

The transmitter 515 may transmit signals received from other components of device 501. In some embodiments, the transmitter 515 may be collocated with the receiver 505 in a transceiver module. The transmitter 515 may include a single antenna, or it may include a plurality of antennas.

Figure 6:
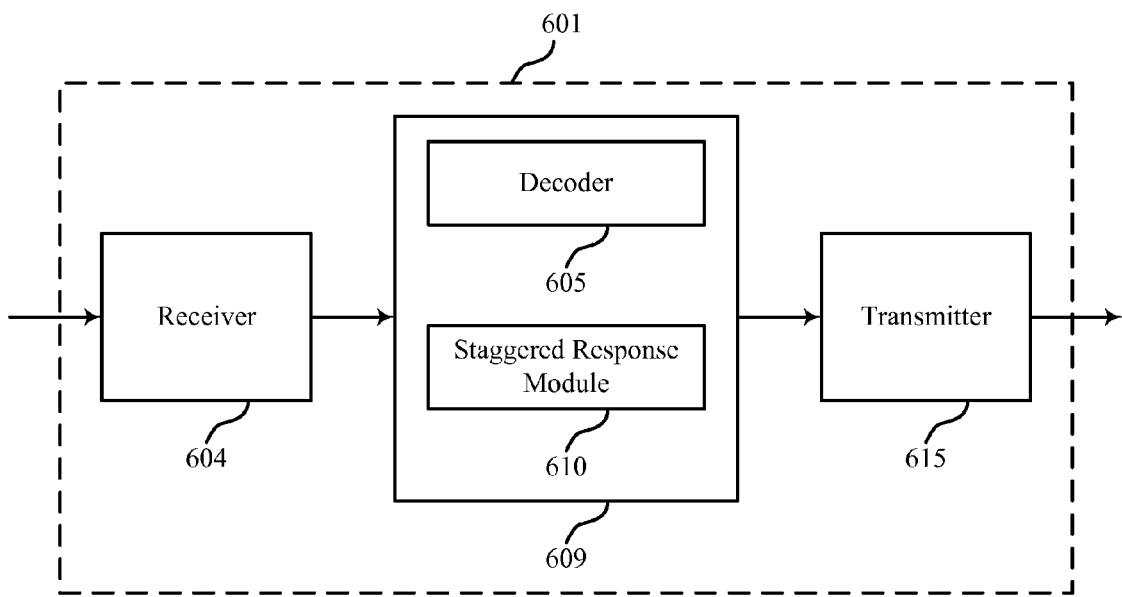
FIG. 6 shows a block diagram of a device configured for low latency communication in accordance with various aspects of the present disclosure.

FIG. 6 shows a block diagram 600 of a device 601 for low latency communication in accordance with various aspects of the present disclosure. Device 601 may be an example of aspects of a UE 115, 212, 412, 413, a base station 105, 203, 403, 404, or a device 501 described with reference to FIGS. 1-5. device 601 may include a receiver 604, a low latency response module 609, or a transmitter 615. Device 601 may also include a processor. Each of these components may be in communication with each other. The low latency response module 609 may also include a decoder 605, and a staggered response module 610.

The components of device 601 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 604 may receive information which may be passed on to low latency response module 609, and to other components of device 601. The low latency response module 609 may perform the operations described above with reference to FIG. 5. The transmitter 615 may transmit signals received from other components of device 601.

The decoder 605 may decode the message during a decoding time period that is shorter than the first symbol period as described above with reference to FIGS. 2-4. The decoder 605 may also decode the message during a decoding time period that is shorter than the first symbol period.

The staggered response module 610 may transmit a response to a received message during a staggered control channel symbol period based at least in part on decoding a received message. The response may be transmitted during a second symbol period according to a second timing configuration, wherein the second timing configuration is staggered relative to the first timing configuration according to a predetermined offset as described above with reference to FIGS. 2-4. In some examples, the second symbol period begins prior to a third symbol period of the first timing configuration, wherein the third symbol period immediately follows the first symbol period. In some examples, the second symbol period begins after one half of a length of the first symbol period following the first symbol period according to the first timing configuration, and a length of the second symbol period may be equal to the length of the first symbol period.

Figure 7:
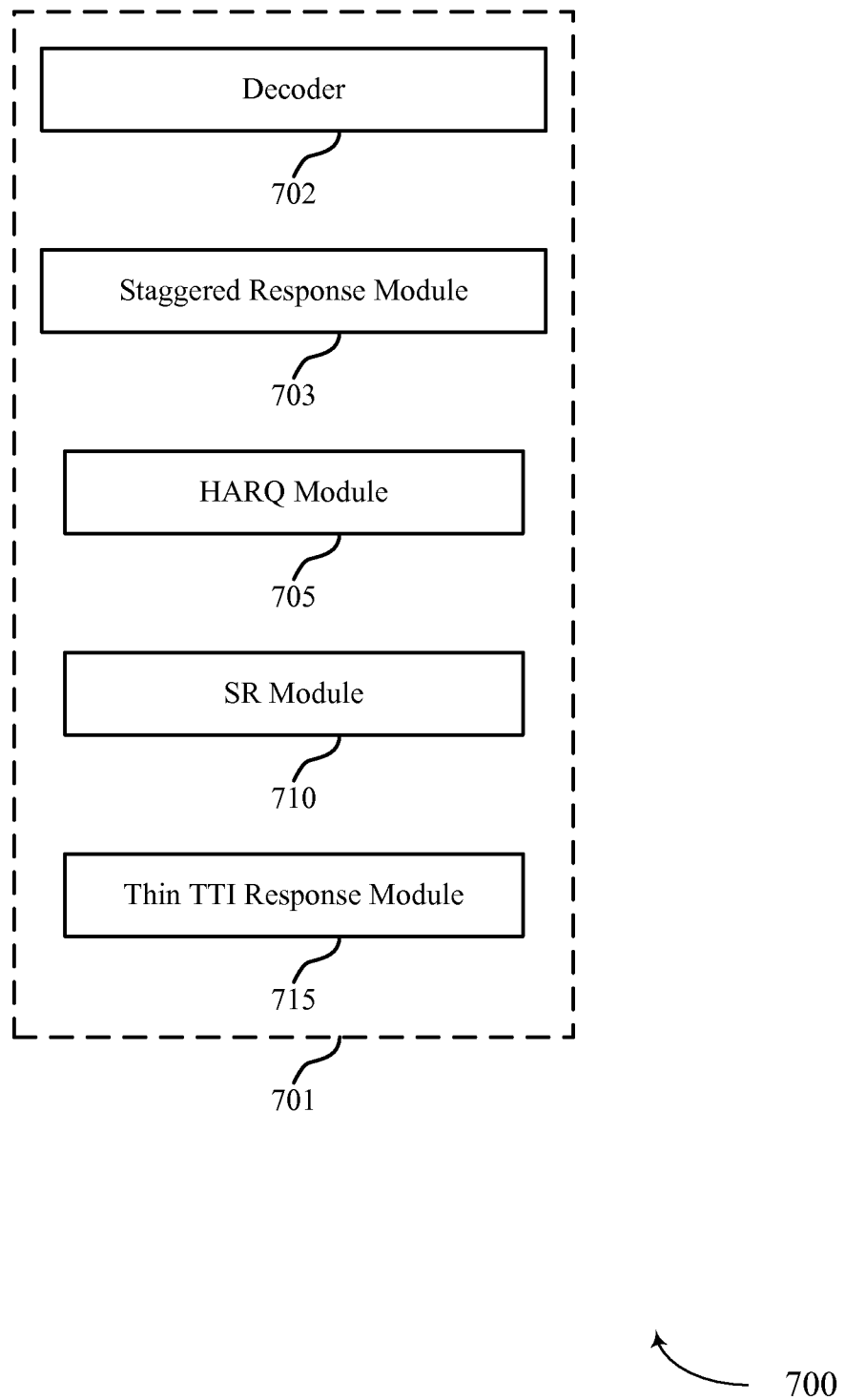
FIG. 7 shows a block diagram of a low latency response module configured for UL/DL waveform and numerology design for low latency communication in accordance with various aspects of the present disclosure.

FIG. 7 shows a block diagram 700 of a low latency response module 701 for low latency communication in accordance with various aspects of the present disclosure. The low latency response module 701 may be an example of aspects of a low latency response module 510 described with reference to FIGS. 5-6. The low latency response module 701 may include a decoder 702, and a staggered response module 703. Each of these modules may perform the functions described above with reference to FIG. 6. The low latency response module 701 may also include a HARQ module 705, a SR module 710, and a thin TTI response module 715.

The components of the low latency response module 701 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The HARQ module 705 may be configured to perform a HARQ process. For example, in some cases a received message may include a data message and a response may include a HARQ feedback message as described above with reference to FIGS. 2-4. In some examples, the HARQ feedback message comprises a NACK message. In some examples, the received message comprises a data transmission based on the data channel timing configuration and the response comprises a HARQ feedback message.

The SR module 710 may be configured to perform an SR process as described above with reference to FIGS. 3B and 3C. For example, a received message may be an SR and the response may be a UL grant as described above with reference to FIGS. 2-4.

The thin TTI response module 715 may be configured to send and receive messages using a thin control channel. For example, the thin TTI response module may send a response to the message based on the decoding during a second symbol period according to a control channel timing configuration, wherein the control channel timing configuration is based on a shorter symbol duration than a data channel timing configuration as described above with reference to FIGS. 2-4.

Figure 8:
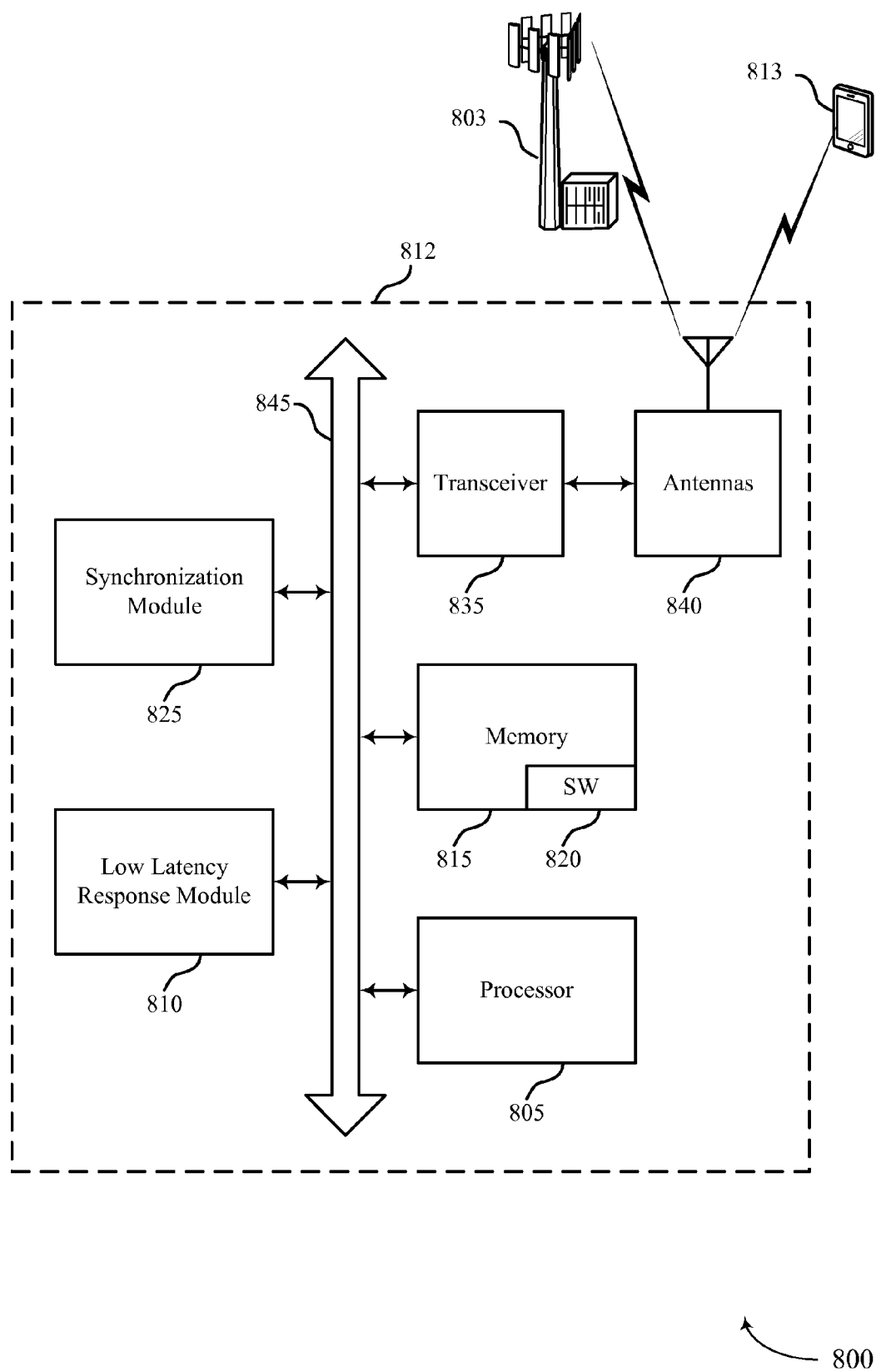
FIG. 8 illustrates a block diagram of a system including a UE configured for UL/DL waveform and numerology design for low latency communication in accordance with various aspects of the present disclosure.

FIG. 8 shows a diagram of a system 800 including a UE configured for low latency communication in accordance with various aspects of the present disclosure. System 800 may include UE 812, which may be an example of a UE described above with reference to FIGS. 1-7. UE 812 may include a low latency response module 810, which may be an example of a low latency response module 701 described with reference to FIG. 7. UE 812 may also include a synchronization module 825. UE 812 may also include components for bi-directional voice and data communications including components for transmitting communications and components for receiving communications. For example, UE 812 may communicate bi-directionally with UE 813 or base station 803.

Synchronization module 825 may synchronize a frame structure of UE 812 with base station 803. For example, synchronization module 825 may receive and process primary and secondary synchronization signals (PSS and SSS). In some cases, a staggered control channel may be based at least in part on this synchronization.

UE 812 may also include a processor module 805, and memory 815 (including software (SW) 820), a transceiver module 835, and one or more antenna(s) 840, each of which may communicate, directly or indirectly, with one another (e.g., via buses 845). The transceiver module 835 may communicate bi-directionally, via the antenna(s) 840 or wired or wireless links, with one or more networks, as described above. For example, the transceiver module 835 may communicate bi-directionally with a base station 803 or another UE 813. The transceiver module 835 may include a modem to modulate the packets and provide the modulated packets to the antenna(s) 840 for transmission, and to demodulate packets received from the antenna(s) 840. While UE 812 may include a single antenna 840, UE 812 may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., low latency communication, etc.). Alternatively, the software/firmware code 820 may not be directly executable by the processor module 805 but cause a computer (e.g., when compiled and executed) to perform functions described herein. The processor module 805 may include an intelligent hardware device (e.g., a central processing unit (CPU), a microcontroller, an ASIC, etc.).

Figure 9:
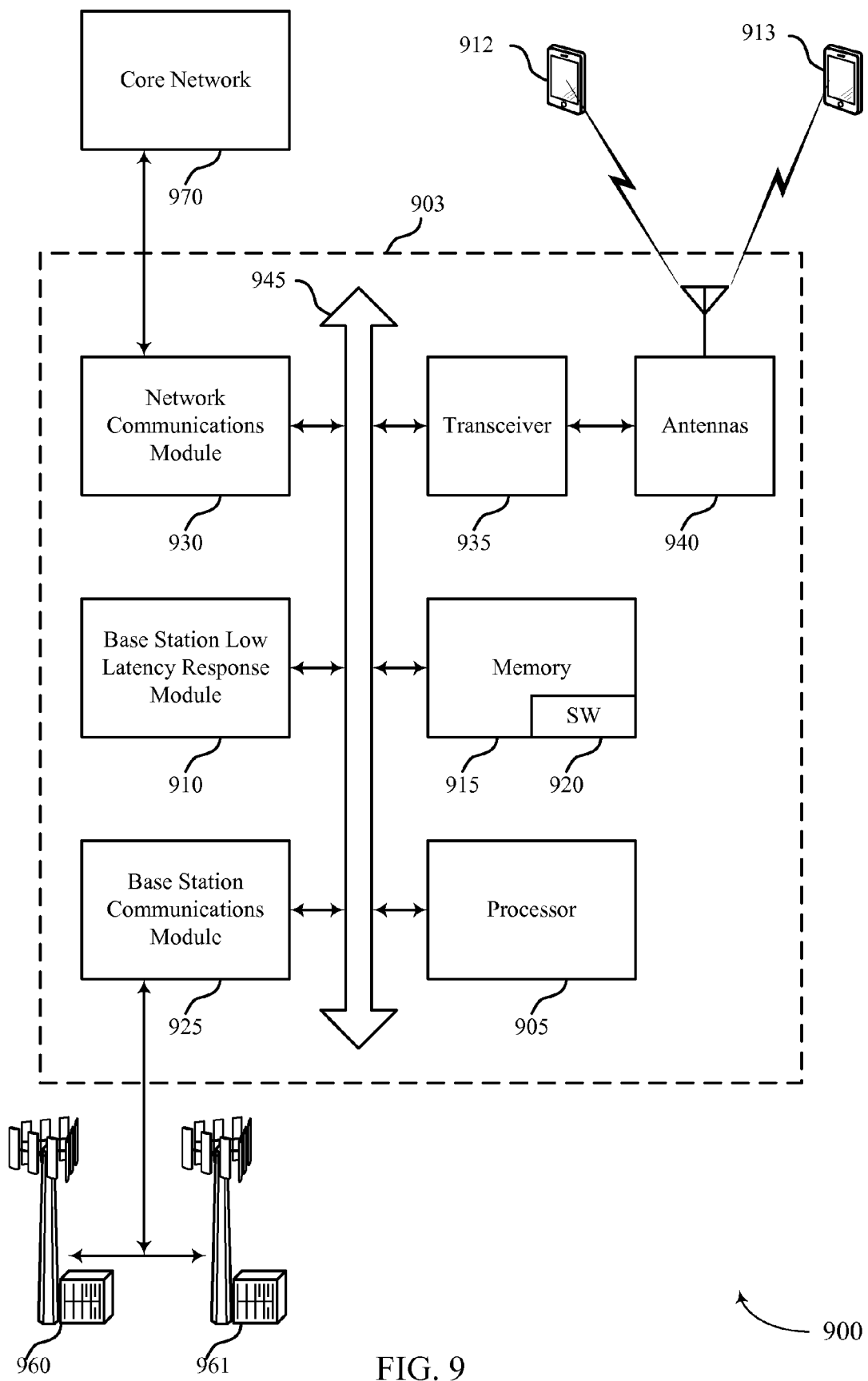
FIG. 9 illustrates a block diagram of a system including a base station configured for low latency communication in accordance with various aspects of the present disclosure.

FIG. 9 shows a diagram of a system 900 including a base station configured for low latency communication in accordance with various aspects of the present disclosure. System 900 may include base station 903, which may be an example of a base station described above with reference to FIGS. 1-8. Base station 903 may include a base station low latency response module 910, which may be an example of a low latency response module 701 described with reference to FIG. 7. Base station 903 may also include components for bi-directional voice and data communications including components for transmitting communications and components for receiving communications. For example, base station 903 may communicate bi-directionally with UE 912 or UE 913.

In some cases, base station 903 may have one or more wired backhaul links. Base station 903 may have a wired backhaul link (e.g., S1 interface, etc.) to the core network 970. Base station 903 may also communicate with other base stations, such as base station 960 and base station 961 via inter-base station backhaul links (e.g., an X2 interface). Each of the base stations may communicate with UEs 921 and 913 using the same or different wireless communications technologies. In some cases, base station 903 may communicate with other base stations such as 960 or 961 utilizing base station communications module 925. In some embodiments, base station communications module 925 may provide an X2 interface within an LTE/LTE-A wireless communication network technology to provide communication between some of the base stations. In some embodiments, base station 903 may communicate with other base stations through core network 970. In some cases, base station 903 may communicate with the core network 970 through network communications module 930.

The base station 903 may include a processor module 905, memory 915 (including software (SW) 920), transceiver modules 935, and antenna(s) 940, which each may be in communication, directly or indirectly, with one another (e.g., over bus system 945). The transceiver modules 935 may be configured to communicate bi-directionally, via the antenna(s) 940, with the UEs 115, which may be multi-mode devices. The transceiver module 935 (or other components of base station 105-e) may also be configured to communicate bi-directionally, via the antennas 940, with one or more other base stations (not shown). The transceiver module 935 may include a modem configured to modulate the packets and provide the modulated packets to the antennas 940 for transmission, and to demodulate packets received from the antennas 940. The base station 105-e may include multiple transceiver modules 935, each with one or more associated antennas 940. The transceiver module may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor module 905 to perform various functions described herein (e.g., low latency communication, selecting coverage enhancement techniques, call processing, database management, message routing, etc.). Alternatively, the software code 920 may not be directly executable by the processor module 905 but be configured to cause the computer (e.g., when compiled and executed), to perform functions described herein. The processor module 905 may include an intelligent hardware device, (e.g., a CPU, a microcontroller, an ASIC, etc.). The processor module 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 912 and 913 in cooperation with other base stations 960 and 961. For example, the base station communications module 925 may coordinate scheduling for transmissions to UEs 912 and 913 for various interference mitigation techniques such as beamforming or joint transmission.

Figure 10:
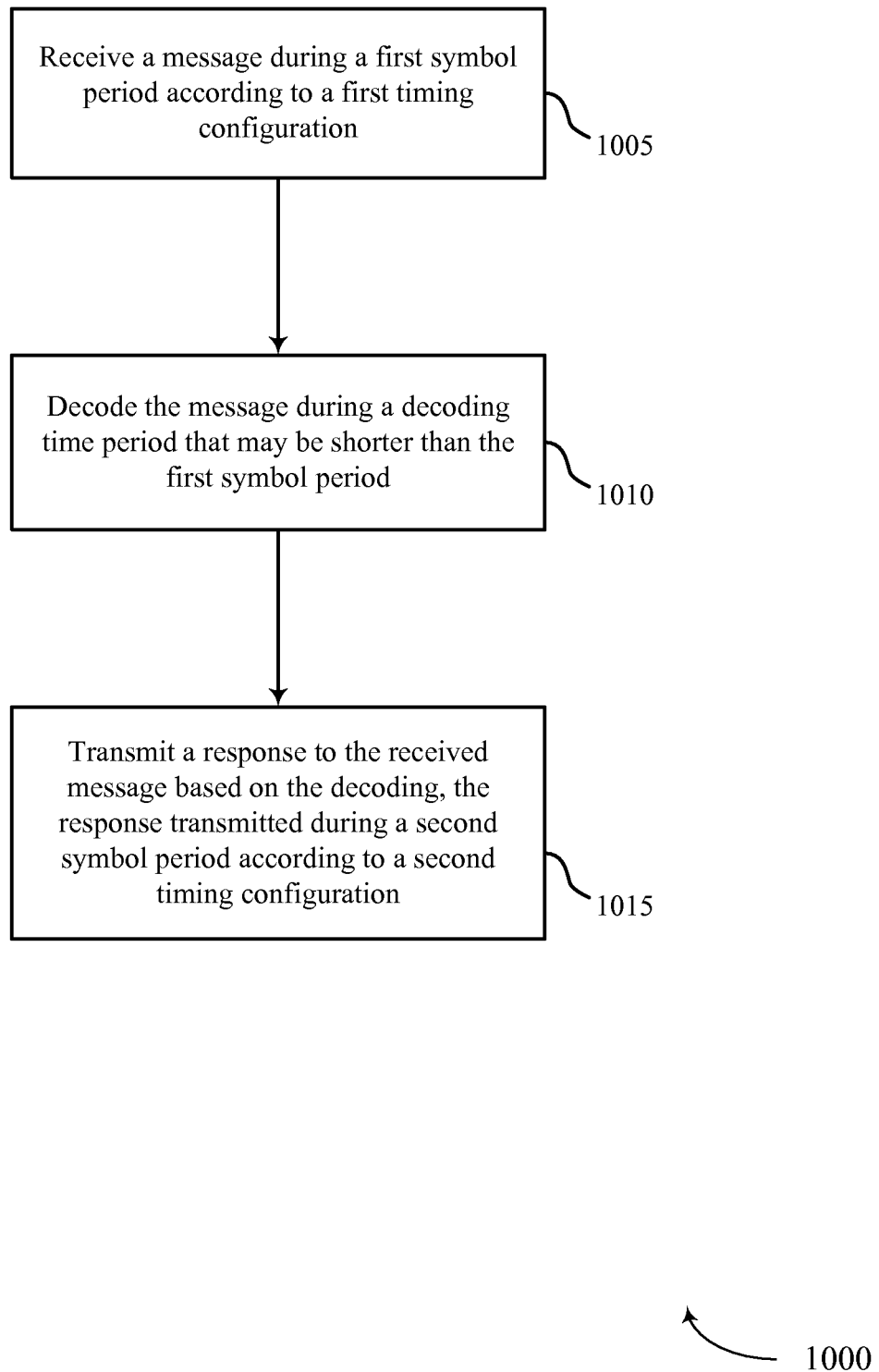
FIG. 10 shows a flowchart illustrating a method for low latency communication in accordance with various aspects of the present disclosure.

FIG. 10 shows a flowchart illustrating a method 1000 for low latency communication in accordance with various aspects of the present disclosure. The operations of method 1000 may be implemented by a UE or a base station or its components as described with reference to FIGS. 1-9. For example, the operations of method 1000 may be performed by the low latency response module 510, 609, or 701 as described with reference to FIGS. 5-7. In some examples, a UE may execute a set of codes to control the functional elements of the UE to perform the functions described below. Additionally or alternatively, the UE may perform aspects the functions described below using special-purpose hardware.

At block 1005, the device may receive a message during a first symbol period according to a first timing configuration as described above with reference to FIGS. 2-4. In certain examples, the operations of block 1005 may be performed by the receiver 505 as described above with reference to FIG. 5.

At block 1010, the device may decode the message during a decoding time period that is shorter than the first symbol period as described above with reference to FIGS. 2-4. In certain examples, the operations of block 1010 may be performed by the decoder 605 as described above with reference to FIG. 6.

At block 1015, the device may transmit a response to the received message based at least in part on the decoding. The response may be transmitted during a second symbol period and according to a second timing configuration. In some cases, the second timing configuration is staggered relative to the first timing configuration according to a predetermined offset as described above with reference to FIGS. 2-4. In certain examples, the operations of block 1015 may be performed by the staggered response module 610 as described above with reference to FIG. 6.

Figure 11:
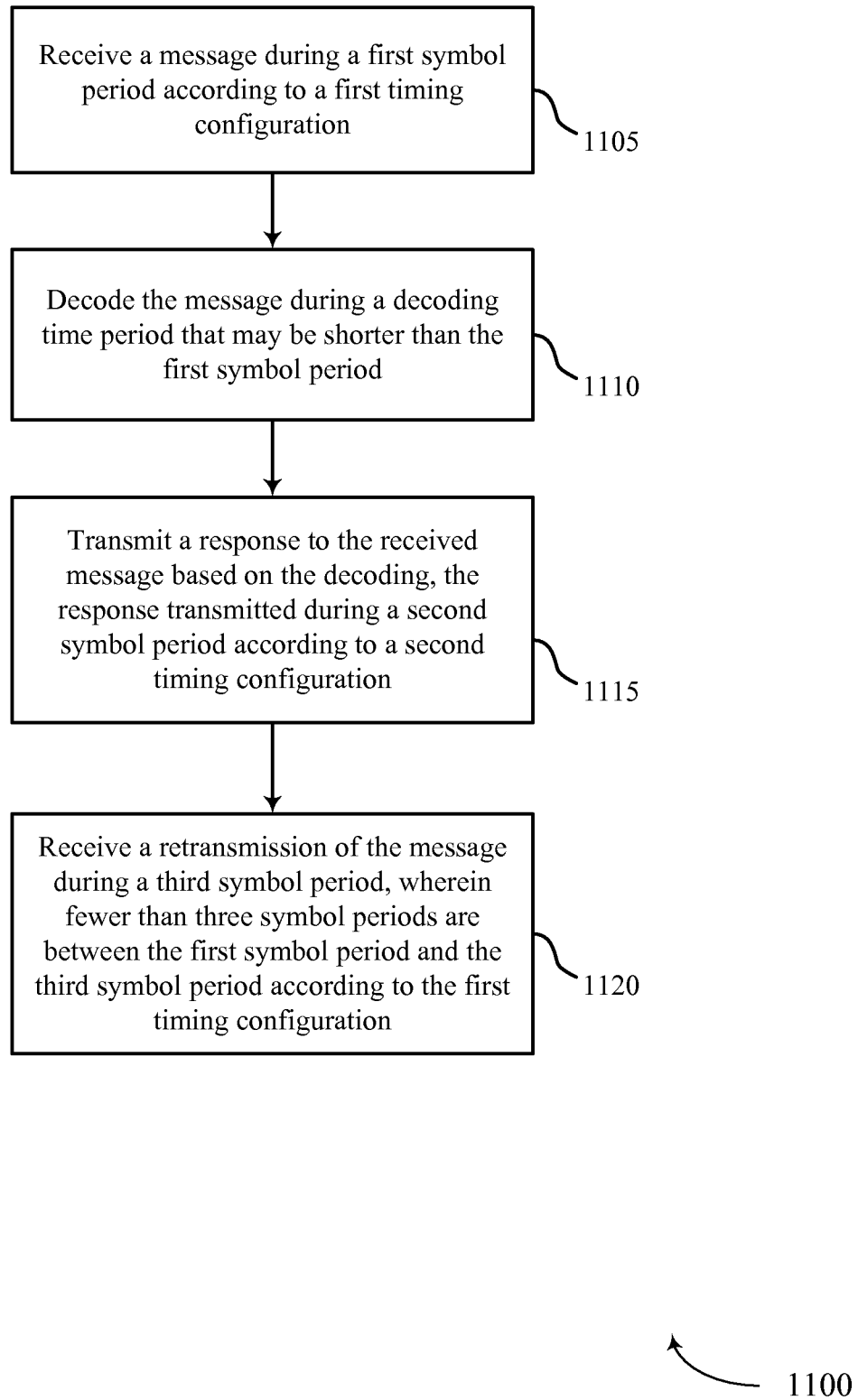
FIG. 11 shows a flowchart illustrating a method for low latency communication in accordance with various aspects of the present disclosure.

FIG. 11 shows a flowchart illustrating a method 1100 for low latency communication in accordance with various aspects of the present disclosure. The operations of method 1100 may be implemented by a UE or a base station or its components as described with reference to FIGS. 1-9. For example, the operations of method 1100 may be performed by the low latency response module 510, 609, or 701 as described with reference to FIGS. 5-7. In some examples, a UE may execute a set of codes to control the functional elements of the UE to perform the functions described below. Additionally or alternatively, the UE may perform aspects the functions described below using special-purpose hardware. The method 1100 may also incorporate aspects of method 1000 of FIG. 10.

At block 1105, the device may receive a message during a first symbol period according to a first timing configuration as described above with reference to FIGS. 2-4. In some instances the message may include a data message. In certain examples, the operations of block 1105 may be performed by the receiver 505 as described above with reference to FIG. 5.

At block 1110, the device may decode the message during a decoding time period that is shorter than the first symbol period as described above with reference to FIGS. 2-4. In certain examples, the operations of block 1110 may be performed by the decoder 605 as described above with reference to FIG. 6.

At block 1115, the device may transmit a response (e.g., a HARQ feedback message) to the received message based at least in part on the decoding. In some cases, the message may comprise a NACK message. The response may be transmitted during a second symbol period according to a second timing configuration. In some examples the second timing configuration is staggered relative to the first timing configuration according to a predetermined offset as described above with reference to FIGS. 2-4. In certain examples, the operations of block 1115 may be performed by the staggered response module 610 as described above with reference to FIG. 6.

At block 1120, the device may receive a retransmission of the message during a third symbol period according to the first timing configuration as described above with reference to FIGS. 2-4. In some cases, fewer than three symbol periods are between the first symbol period and the third symbol period. In certain examples, the operations of block 1130 may be performed by the receiver 505 as described above with reference to FIG. 5.

Figure 12:
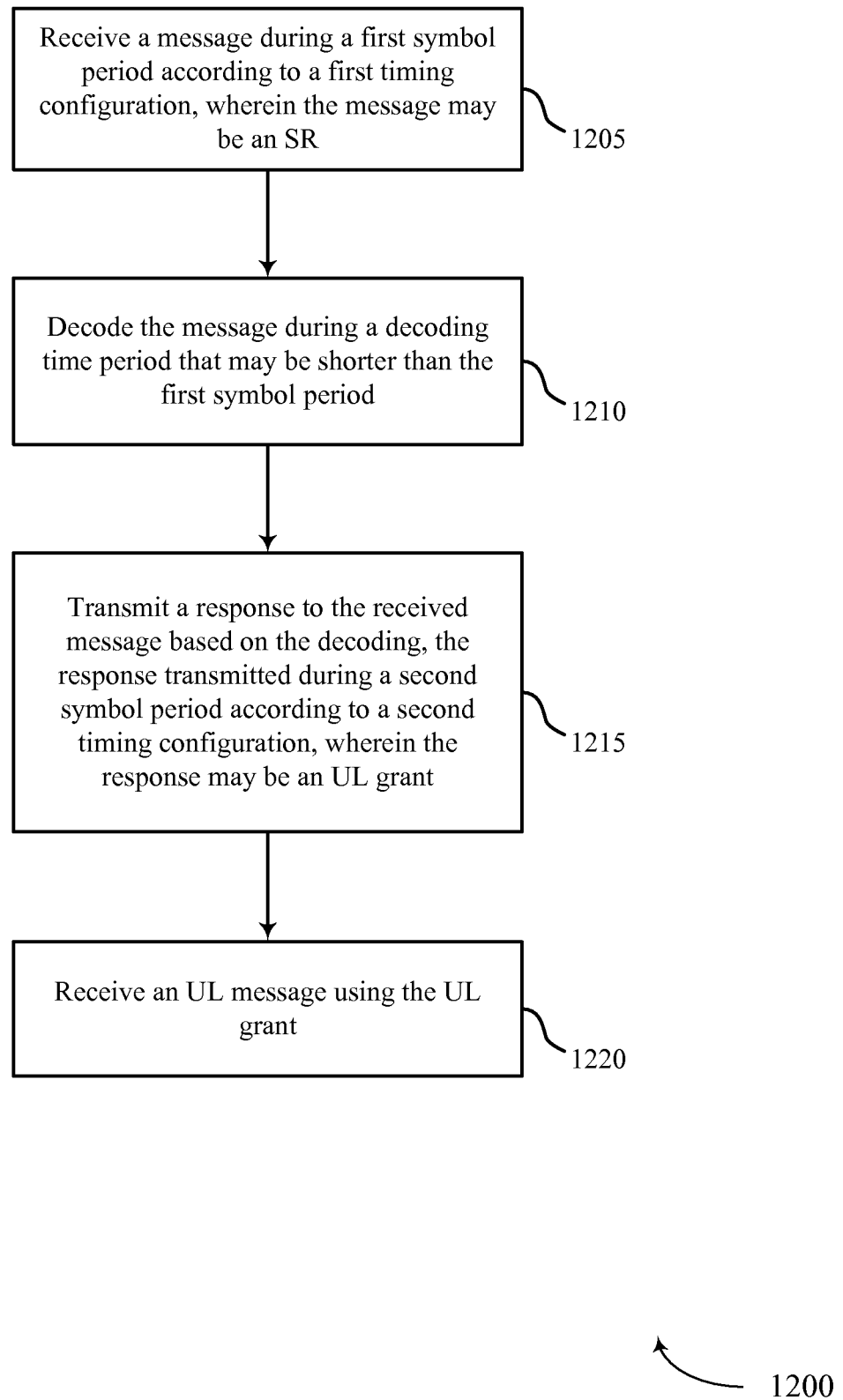
FIG. 12 shows a flowchart illustrating a method for UL/DL waveform and numerology design for low latency communication in accordance with various aspects of the present disclosure.

FIG. 12 shows a flowchart illustrating a method 1200 for low latency communication in accordance with various aspects of the present disclosure. The operations of method 1200 may be implemented by a UE base station or its components as described with reference to FIGS. 1-9. For example, the operations of method 1200 may be performed by the low latency response module 510, 609, or 701 as described with reference to FIG. 5-7. In some examples, a base station may execute a set of codes to control the functional elements of the base station to perform the functions described below. Additionally or alternatively, the base station may perform aspects of the functions described below using special-purpose hardware. The method 1200 may also incorporate aspects of methods 1000, and 1100 of FIGS. 10-11.

At block 1205, the base station may receive a message during a first symbol period according to a first timing configuration as described above with reference to FIGS. 2-4. In some cases, the message may be a scheduling request (SR). In certain examples, the operations of block 1205 may be performed by the transceiver module 935 as described above with reference to FIG. 9.

At block 1210, the base station may decode the message during a decoding time period that is shorter than the first symbol period as described above with reference to FIGS. 2-4. In certain examples, the operations of block 1210 may be performed by the decoder 605 as described above with reference to FIG. 6.

At block 1215, the base station may transmit a response to the received message based at least in part on the decoding. The response may be transmitted during a second symbol period according to a second timing configuration. In some cases, the second timing configuration is staggered relative to the first timing configuration according to a predetermined offset as described above with reference to FIGS. 2-4. In certain examples, the operations of block 1215 may be performed by the staggered response module 610 as described above with reference to FIG. 6.

At block 1220, the base station may receive an uplink message from UE 115 using the UL grant. In certain examples, the operations of block 1220 may be performed by the transceiver module 935 as described above with reference to FIG. 9.

Figure 13:
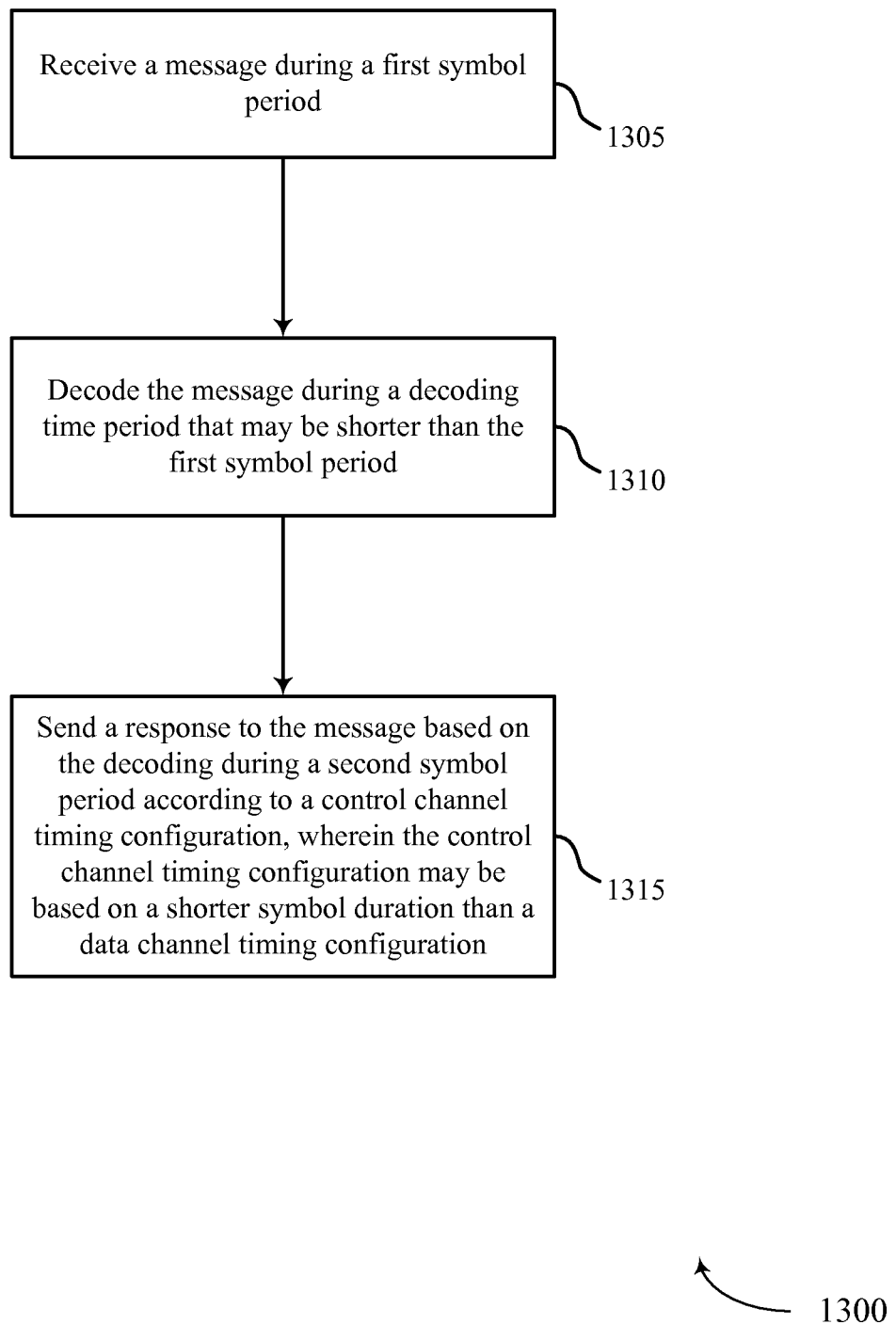
FIG. 13 shows a flowchart illustrating a method for low latency communication in accordance with various aspects of the present disclosure.

FIG. 13 shows a flowchart illustrating a method 1300 for low latency communication in accordance with various aspects of the present disclosure. The operations of method 1300 may be implemented by a UE or its components as described with reference to FIGS. 1-8. For example, the operations of method 1300 may be performed by the low latency response module 510, 609, or 701 as described with reference to FIGS. 5-7. In some examples, a UE may execute a set of codes to control the functional elements of the UE to perform the functions described below. Additionally or alternatively, the UE may perform aspects the functions described below using special-purpose hardware. The method 1300 may also incorporate aspects of methods 1000, 1100, and 1200 of FIGS. 10-12.

At block 1305, the UE may receive a message during a first symbol period as described above with reference to FIGS. 2-4. In certain examples, the operations of block 1305 may be performed by the receiver 505 as described above with reference to FIG. 5.

At block 1310, the UE may decode the message during a decoding time period that is shorter than the first symbol period as described above with reference to FIGS. 2-4. In certain examples, the operations of block 1310 may be performed by the decoder 605 as described above with reference to FIG. 6.

At block 1315, the UE may send a response to the message based on the decoding during a second symbol period according to a control channel timing configuration, wherein the control channel timing configuration is based on a shorter symbol duration than a data channel timing configuration as described above with reference to FIGS. 2-4. In certain examples, the operations of block 1315 may be performed by the thin TTI response module 715 as described above with reference to FIG. 7.

Figure 14:
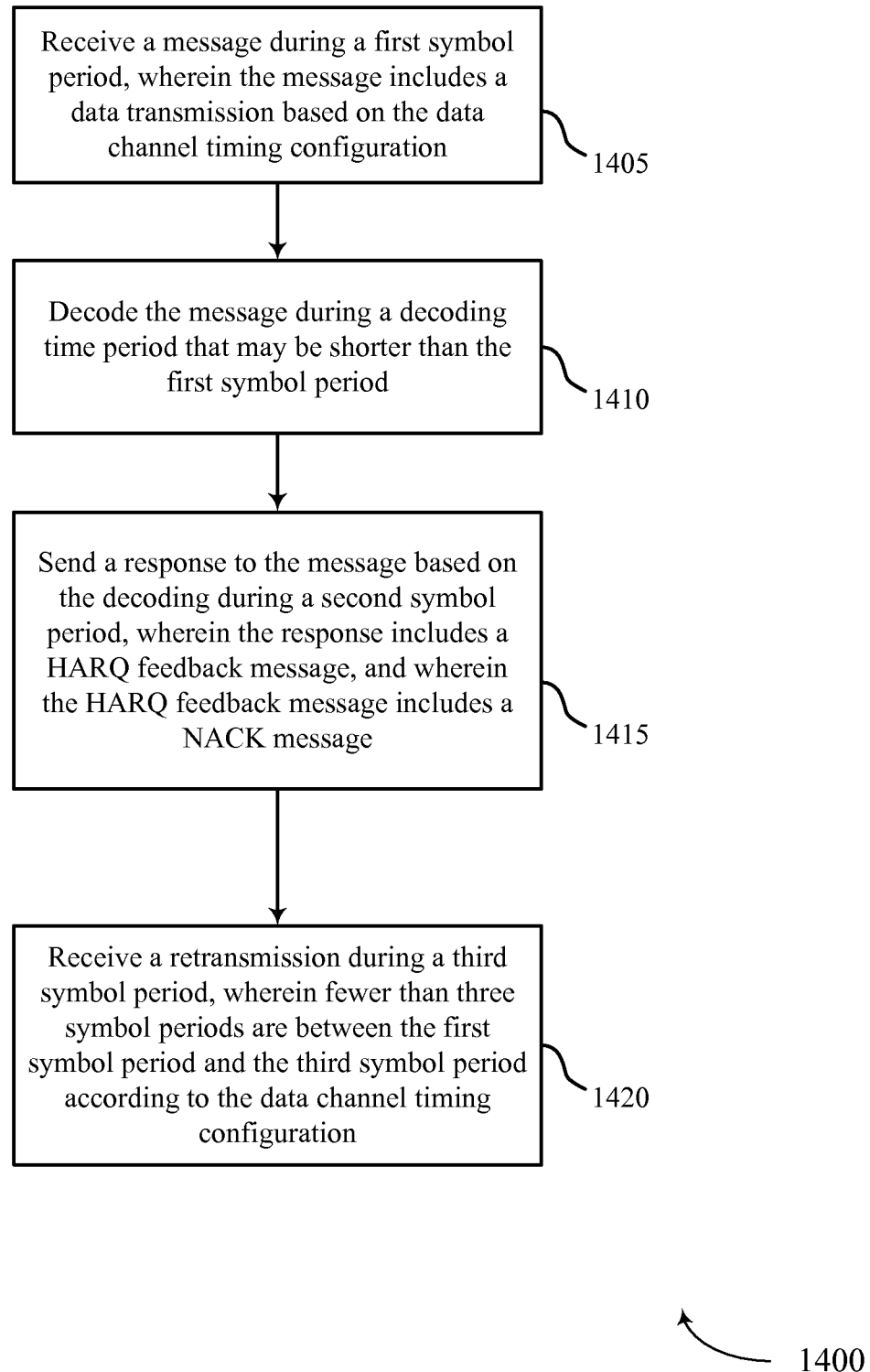
FIG. 14 shows a flowchart illustrating a method for low latency communication in accordance with various aspects of the present disclosure.

FIG. 14 shows a flowchart illustrating a method 1400 for low latency communication in accordance with various aspects of the present disclosure. The operations of method 1400 may be implemented by a UE or a base station or its components as described with reference to FIGS. 1-9. For example, the operations of method 1400 may be performed by the low latency response module 510, 609, or 701 as described with reference to FIGS. 5-7. In some examples, a UE may execute a set of codes to control the functional elements of the UE to perform the functions described below. Additionally or alternatively, the UE may perform aspects the functions described below using special-purpose hardware. The method 1400 may also incorporate aspects of methods 1000, 1100, 1200, and 1300 of FIGS. 10-13.

At block 1405, the device may receive a message during a first symbol period as described above with reference to FIGS. 2-4. In certain examples, the operations of block 1405 may be performed by the receiver 505 as described above with reference to FIG. 5.

At block 1410, the device may decode the message during a decoding time period that is shorter than the first symbol period as described above with reference to FIGS. 2-4. In certain examples, the operations of block 1410 may be performed by the decoder 605 as described above with reference to FIG. 6.

At block 1415, the device may send a response to the message based on the decoding during a second symbol period according to a control channel timing configuration, wherein the control channel timing configuration is based on a shorter symbol duration than a data channel timing configuration as described above with reference to FIGS. 2-4. In some cases, the message comprises a data transmission based on the data channel timing configuration and the response comprises a HARQ feedback message. For example, the HARQ feedback message comprises a NACK message. In certain examples, the operations of block 1415 may be performed by the thin TTI response module 715 as described above with reference to FIG. 7.

At block 1420, the device may receive a retransmission during a third symbol period, wherein fewer than three symbol periods are between the first symbol period and the third symbol period according to the data channel timing configuration as described above with reference to FIGS. 2-4. In certain examples, the operations of block 1420 may be performed by the receiver 505 as described above with reference to FIG. 5.

Figure 15:
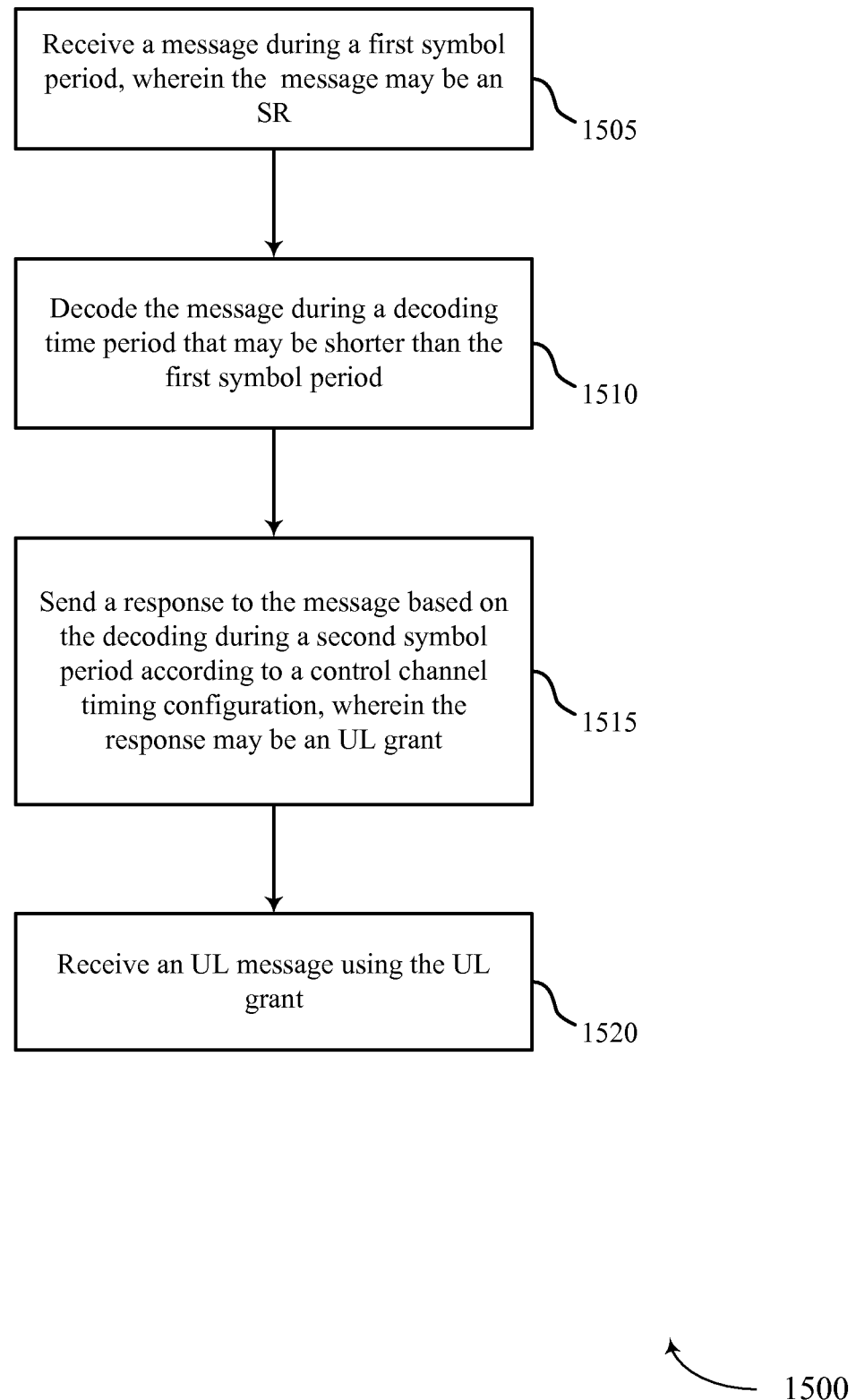
FIG. 15 shows a flowchart illustrating a method for low latency communication in accordance with various aspects of the present disclosure.

FIG. 15 shows a flowchart illustrating a method 1500 for low latency communication in accordance with various aspects of the present disclosure. The operations of method 1500 may be implemented by a base station or its components as described with reference to FIGS. 1-9. For example, the operations of method 1500 may be performed by the low latency response module 510, 609, or 701 as described with reference to FIGS. 5-7. In some examples, a base station may execute a set of codes to control the functional elements of the base station to perform the functions described below. Additionally or alternatively, the base station may perform aspects the functions described below using special-purpose hardware. The method 1500 may also incorporate aspects of methods 1000, 1100, 1200, 1300, and 1400 of FIGS. 10-14.

At block 1505, the base station may receive a message during a first symbol period as described above with reference to FIGS. 2-4. In certain examples, the operations of block 1505 may be performed by the receiver 505 as described above with reference to FIG. 5.

At block 1510, the base station may decode the message during a decoding time period that is shorter than the first symbol period as described above with reference to FIGS. 2-4. In certain examples, the operations of block 1510 may be performed by the decoder 605 as described above with reference to FIG. 6. In some cases, the message is an SR and the response is a UL grant.

At block 1515, the base station may send a response to the message based on the decoding during a second symbol period according to a control channel timing configuration, wherein the control channel timing configuration is based on a shorter symbol duration than a data channel timing configuration as described above with reference to FIGS. 2-4. In certain examples, the operations of block 1515 may be performed by the thin TTI response module 715 as described above with reference to FIG. 7.

At block 1520, the base station may receive a UL message using the UL grant as described above with reference to FIGS. 2-4. In certain examples, the operations of block 1520 may be performed by the receiver 505 as described above with reference to FIG. 5.

Thus, methods 1000, 1100, 1200, 1300, 1400, and 1500 may provide for low latency communication. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method for wireless communications, comprising:
receiving a message during a first symbol period according to a first timing configuration, wherein the message comprises one of a data message or a scheduling request (SR);
decoding the message during a decoding time period that is shorter than the first symbol period; and
transmitting a response to the received message based at least in part on the decoding, the response transmitted during a second symbol period according to a second timing configuration, wherein the second timing configuration is staggered relative to the first timing configuration according to a predetermined offset, wherein the response comprises one of a hybrid automatic repeat request (HARQ) feedback message or an uplink (UL) grant.

2. The method of claim 1, wherein the HARQ feedback message comprises a negative acknowledgement (NACK) message; and
the method further comprising receiving a retransmission of the message during a third symbol period, wherein fewer than three symbol periods are between the first symbol period and the third symbol period according to the first timing configuration.

3. The method of claim 1,
further comprising:
receiving a UL message using the UL grant.

4. The method of claim 1, wherein the second symbol period begins prior to a third symbol period of the first timing configuration, wherein the third symbol period immediately follows the first symbol period.

5. The method of claim 4, wherein the first and third symbol periods comprise downlink (DL) symbol periods and the second symbol period comprises an UL symbol period.

6. The method of claim 1, wherein the second symbol period begins after one half of a length of the first symbol period following the first symbol period according to the first timing configuration, and a length of the second symbol period is equal to the length of the first symbol period.

7. A method for wireless communications, comprising:
receiving a message during a first symbol period, wherein the message comprises one of a data message or a scheduling request (SR);
decoding the message during a decoding time period that is shorter than the first symbol period; and
sending a response to the message based on the decoding during a second symbol period according to a control channel timing configuration, wherein the control channel timing configuration comprises an uplink (UL) control channel timing configuration and a downlink (DL) control channel timing configuration, and is based on a shorter symbol duration than a data channel timing configuration, wherein the response comprises one of a hybrid automatic repeat request (HARQ) feedback message or an UL grant.

8. The method of claim 7, wherein the DL control channel configuration is staggered relative to the UL control channel timing configuration according to a offset.

9. The method of claim 8, wherein the offset comprises a predetermined offset.

10. The method of claim 7, wherein the message comprises a data transmission and is based on the data channel timing configuration.

11. The method of claim 10, wherein the HARQ feedback message comprises a negative acknowledgement (NACK) message; and
the method further comprising receiving a retransmission during a third symbol period, wherein fewer than three symbol periods are between the first symbol period and the third symbol period according to the data channel timing configuration.

12. The method of claim 7,
further comprising:
receiving a UL message using the UL grant.

13. The method of claim 7, wherein the second symbol period begins prior to a third symbol period of the first timing configuration, wherein the third symbol period immediately follows the first symbol period.

14. The method of claim 7, wherein the second symbol period begins after one half of a length of the first symbol period following the first symbol period according to the first timing configuration, and a length of the second symbol period is equal to the length of the first symbol period.

15. An apparatus for wireless communications, comprising:
a processor;
memory coupled to the processor, wherein the processor is configured to:
receive a message during a first symbol period according to a first timing configuration, wherein the message comprises one of a data message or a scheduling request (SR);
decode the message during a decoding time period that is shorter than the first symbol period; and
transmit a response to the received message based at least in part on the decoding, the response transmitted during a second symbol period according to a second timing configuration, wherein the second timing configuration is staggered relative to the first timing configuration according to a predetermined offset, and wherein the response comprises one of a hybrid automatic repeat request (HARQ) feedback message or an uplink (UL) grant.

16. The apparatus of claim 15, wherein the HARQ feedback message comprises a negative acknowledgement (NACK) message; and
wherein the processor is configured to receive a retransmission of the message during a third symbol period, wherein fewer than three symbol periods are between the first symbol period and the third symbol period according to the first timing configuration.

17. The apparatus of claim 15,
wherein the processor is configured to receive a UL message using the UL grant.

18. The apparatus of claim 15, wherein the second symbol period begins prior to a third symbol period of the first timing configuration, wherein the third symbol period immediately follows the first symbol period.

19. The apparatus of claim 15, wherein the second symbol period begins after one half of a length of the first symbol period following the first symbol period according to the first timing configuration, and a length of the second symbol period is equal to the length of the first symbol period.

20. The apparatus of claim 19, wherein the first and third symbol periods are DL symbol periods and the third symbol period is an UL symbol period.

21. An apparatus for wireless communications, comprising:
a processor;
memory coupled to the processor, wherein the processor is configured to:
receive a message during a first symbol period, wherein the message comprises one of a data message or a scheduling request (SR);
decode the message during a decoding time period that is shorter than the first symbol period; and
send a response to the message based on the decoding during a second symbol period according to a control channel timing configuration, wherein the control channel timing configuration comprises an uplink (UL) control channel timing configuration and a downlink (DL) control channel timing configuration, and is based on a shorter symbol duration than a data channel timing configuration, and wherein the response comprises one of a hybrid automatic repeat request (HARQ) feedback message or an UL grant.

22. The apparatus of claim 21, wherein the DL control channel configuration is staggered in time relative to the UL control channel timing configuration according to an offset.

23. The apparatus of claim 21, wherein the offset comprises a predetermined offset.

24. The apparatus of claim 21, wherein the HARQ feedback message comprises a negative acknowledgement (NACK) message; and
wherein the processor is configured to receive a retransmission during a third symbol period, wherein fewer than three symbol periods are between the first symbol period and the third symbol period according to the data channel timing configuration.

25. The apparatus of claim 21,
wherein the processor is configured to receive a UL message using the UL grant.

26. The apparatus of claim 21, wherein the second symbol period begins prior to a third symbol period of the first timing configuration, wherein the third symbol period immediately follows the first symbol period.

27. The apparatus of claim 21, wherein the second symbol period begins after one half of a length of the first symbol period following the first symbol period according to the first timing configuration, and a length of the second symbol period is equal to the length of the first symbol period.

* * * * *